(12) United States Patent
Yu et al.

(10) Patent No.: US 11,532,181 B2
(45) Date of Patent: Dec. 20, 2022

(54) PROVISION OF TARGETED ADVERTISEMENTS BASED ON USER INTENT, EMOTION AND CONTEXT

(71) Applicant: Samsung Electronics Co., Ltd., Gyeonggi-do (KR)

(72) Inventors: Yong Ju Yu, Seoul (KR); Ja Min Goo, Gyeonggi-do (KR); Seong Hoon You, Gyeonggi-do (KR); Ki Young Kwon, Gyeonggi-do (KR); Ki Won Kim, Gyeonggi-do (KR); Eun Young Kim, Seoul (KR); Ji Min Kim, Busan (KR); Chul Kwi Kim, Gyeonggi-do (KR); Hyung Woo Kim, Gyeonggi-do (KR); Joo Namkung, Gyeonggi-do (KR); Ji Hyun Park, Gyeonggi-do (KR); Sae Gee Oh, Gyeonggi-do (KR); Dong Kyu Lee, Gyeonggi-do (KR); Im Sung Lee, Gyeonggi-do (KR); Chan Won Lee, Gyeonggi-do (KR); Si Hak Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1301 days.

(21) Appl. No.: 15/941,230

(22) Filed: Mar. 30, 2018

(65) Prior Publication Data
US 2018/0285752 A1    Oct. 4, 2018

(30) Foreign Application Priority Data
Mar. 31, 2017    (KR) .......................... 10-2017-0041789

(51) Int. Cl.
*G06V 40/20*    (2022.01)
*G06N 5/04*    (2006.01)
(Continued)

(52) U.S. Cl.
CPC ............ *G06V 40/20* (2022.01); *G06F 16/332* (2019.01); *G06N 5/022* (2013.01); *G06N 5/04* (2013.01);
(Continued)

(58) Field of Classification Search
CPC ...... G06N 5/04; G06N 5/022; G06Q 30/0256; G06Q 30/0257; G06F 16/332;
(Continued)

(56) References Cited

U.S. PATENT DOCUMENTS 7,676,369 B2 *   3/2010   Fujimoto ................ G10L 15/22
                                                            704/275
7,889,073 B2     2/2011   Zalewski
(Continued)

FOREIGN PATENT DOCUMENTS

JP          2002-288527 A       10/2002

OTHER PUBLICATIONS

European Search Report dated Feb. 21, 2020.
International Search Report dated Jul. 23, 2018.

*Primary Examiner* — Angela A Armstrong
(74) *Attorney, Agent, or Firm* — Cha & Reiter, LLC

(57) ABSTRACT

An electronic device and method are disclosed herein. The electronic device includes a microphone, a camera, an output device, a memory, and a processor. The processor implements the method, including receiving a voice input and/or capturing an image, and analyze the first voice input or the image to determine at least one of a user's intent, emotion, and situation based on predefined keywords and expressions, identifying a category based on the input, selecting first information based on the category, selecting and outputting a first query prompting confirmation of output of the first information, detect a first responsive input to the first query, and when a condition to output the first (Continued)

information is satisfied, output a second query, detecting a second input responsive to the second query, and selectively outputting the first information based on the second input.

16 Claims, 13 Drawing Sheets

(51) Int. Cl.
| | | |
|---|---|---|
| *G06N 5/02* | (2006.01) | |
| *G10L 25/27* | (2013.01) | |
| *G06Q 30/02* | (2012.01) | |
| *G06F 16/332* | (2019.01) | |
| *G10L 25/63* | (2013.01) | |
| *G10L 13/00* | (2006.01) | |
| *G10L 15/08* | (2006.01) | |
| *G10L 15/22* | (2006.01) | |
| *G10L 15/18* | (2013.01) | |

(52) U.S. Cl.
CPC ..... *G06Q 30/0256* (2013.01); *G06Q 30/0257* (2013.01); *G10L 13/00* (2013.01); *G10L 25/27* (2013.01); *G10L 25/63* (2013.01); *G06V 2201/00* (2022.01); *G10L 15/1807* (2013.01); *G10L 15/22* (2013.01); *G10L 2015/088* (2013.01); *G10L 2015/227* (2013.01)

(58) Field of Classification Search
CPC ........ G06F 3/167; G06F 16/43; G06F 16/532; G06F 16/9535; G06F 16/903; G10L 25/27; G10L 2015/088; G10L 13/00; G10L 25/63; G10L 15/1807; G10L 15/22; G10L 2015/227; G06V 40/20; G06V 2201/00

See application file for complete search history.

(56) References Cited

U.S. PATENT DOCUMENTS

| | | |
|---|---|---|
| 8,463,726 B2 | 6/2013 | Jerram et al. |
| 8,751,428 B2 | 6/2014 | Jerram et al. |
| 8,762,316 B2 | 6/2014 | Jerram et al. |
| 8,977,584 B2 | 3/2015 | Jerram et al. |
| 9,390,426 B2 | 7/2016 | Chung et al. |
| 9,424,861 B2 | 8/2016 | Jerram et al. |
| 9,424,862 B2 | 8/2016 | Jerram et al. |
| 9,431,028 B2 | 8/2016 | Jerram et al. |
| 9,594,807 B2 | 3/2017 | Rappoport et al. |
| 10,269,344 B2 * | 4/2019 | Lee .................. G06V 40/174 |
| 2007/0186165 A1 | 8/2007 | Maislos et al. |
| 2008/0004951 A1 | 1/2008 | Huang et al. |
| 2009/0195392 A1 | 8/2009 | Zalewski |
| 2012/0143693 A1 | 6/2012 | Chung et al. |
| 2012/0221502 A1 | 8/2012 | Jerram et al. |
| 2012/0330874 A1 | 12/2012 | Jerram et al. |
| 2013/0117020 A1 | 5/2013 | Chung et al. |
| 2013/0132203 A1 | 5/2013 | Cheng |
| 2013/0317826 A1 | 11/2013 | Jerram et al. |
| 2014/0046976 A1 | 2/2014 | Zhang et al. |
| 2014/0129418 A1 | 5/2014 | Jerram et al. |
| 2014/0136323 A1 | 5/2014 | Zhang et al. |
| 2015/0112666 A1 | 4/2015 | Jerram et al. |
| 2015/0112895 A1 | 4/2015 | Jerram et al. |
| 2015/0170671 A1 | 6/2015 | Jerram et al. |
| 2015/0193507 A1 | 7/2015 | Rappoport et al. |
| 2016/0191958 A1 * | 6/2016 | Nauseef .............. G06V 40/20 725/116 |
| 2017/0124457 A1 | 5/2017 | Jerram et al. |
| 2017/0124460 A1 | 5/2017 | Jerram et al. |

* cited by examiner

PROVISION OF TARGETED ADVERTISEMENTS BASED ON USER INTENT, EMOTION AND CONTEXT

CROSS-REFERENCE TO RELATED APPLICATION(S)

This application is based on and claims priority under 35 U.S.C. § 119 to Korean Patent Application No. 10-2017-0041789, filed on Mar. 31, 2017, in the Korean Intellectual Property Office, the disclosure of which is incorporated by reference herein its entirety.

TECHNICAL FIELD

Embodiments of the present disclosure described herein relate to a method for providing information and an electronic device supporting the same.

BACKGROUND

An electronic device may include a microphone and provide feedback in response to receiving user speech through the microphone. For example, the electronic device may exchange dialogue with the user, and when the user's speech includes a specified instruction, the electronic device may perform a function corresponding to the specified instruction.

The electronic device may provide useful information to the user. For example, the electronic device may analyze the user's speech and, and when determining that the user's speech includes a word related to products and goods, may provide an advertisement for the corresponding products. Also, the electronic device may proceed to facilitate the purchase of the products when receiving speech that includes an instruction to purchase the products.

The above information is presented as background information only to assist with an understanding of the present disclosure. No determination has been made, and no assertion is made, as to whether any of the above might be applicable as prior art with regard to the present disclosure.

SUMMARY

However, when providing information by analyzing speech of the user, the electronic device may provide information irrelevant to the user's intent, emotion, or situation.

Aspects of the present disclosure are to address at least the above-mentioned problems and/or disadvantages and to provide at least the advantages described below. Accordingly, an aspect of the present disclosure is to provide a method for determining whether to provide information, based on a user's voice input and an image of surroundings of the user and to provide an electronic device supporting the same.

In accordance with an aspect of the present disclosure, an electronic device is disclosed including a microphone, a camera, an output device, a memory storing first data storing a plurality of pre-defined user states including at least one of a user intent, a user emotion and a user environment, second data storing a plurality of user reactions including pre-defined user responses and information indicating user facial expressions, a plurality of output information, classified according to conversational categories, and a plurality of pre-defined queries, classified according to the conversational categories, a processor operatively coupled to the microphone, the camera, the output device, and the memory, the processor configured to: receive an input including at least one of voice input through the microphone and an image of a user captured through the camera, analyze the received input to select one of the user reactions from among the stored plurality of user reactions of the second data, retrieve at least one pre-defined user state from the first data, based on mapping of the plurality of pre-defined user states to the plurality of user reactions, identify a conversational category from the at least one pre-defined user state, based on mapping of the pre-defined user states and the conversational categories, and select a first information from among the plurality of output information classified to the identified conversational category and outputting the selected first information through the output device.

In accordance with another aspect of the present disclosure, a method in an electronic device is disclosed, including storing in a memory first data of a plurality of pre-defined user states including at least one of a user intent, a user emotion and a user environment, second data of a plurality of user reactions including pre-defined user responses and information indicating user facial expressions, a plurality of output information classified according to conversational categories, and a plurality of pre-defined queries classified according to the conversational categories, receiving an input including at least one of voice input through a microphone and an image of a user captured through a camera, analyzing by a processor the received input to select one of the user reactions from among the stored plurality of user reactions of the second data, retrieving at least one pre-defined user state from the first data, based on mapping of the plurality of pre-defined user states to the plurality of user reactions, identifying a conversational category from the at least one pre-defined user state, based on mapping of the pre-defined user states and the conversational categories, and selecting a first information from among the plurality of output information classified to the identified conversational category and outputting the selected first information through the output device.

According to embodiments of the present disclosure, user-desired information may be provided at more accurate time by determining whether to provide information, based on an image of surroundings of a user as well as a voice input of the user.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
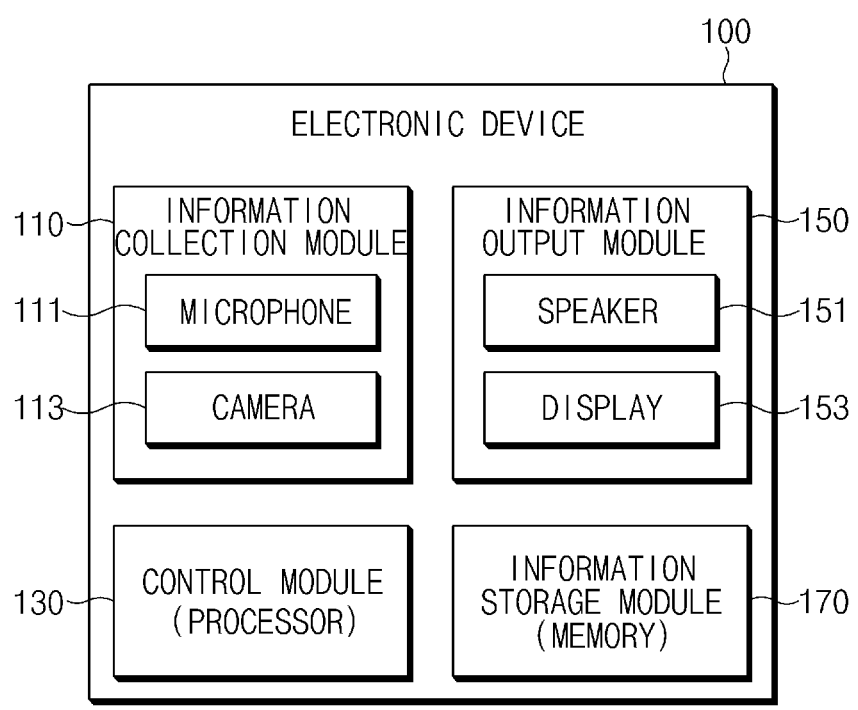
FIG. 1 is a block diagram of an electronic device associated with providing information according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to utilizing various different elements of various embodiments of the present disclosure, but are not intended to limit the elements. For instance, "a first user device" and "a second user device" may indicate different users without implying an order of importance and are used to merely distinguish each component from the others without unduly limiting the components. For example, a first component may be referred to as a second component and vice versa without departing from the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessorytype device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device associated with providing information according to an embodiment.

An electronic device 100 may analyze information related to a user (e.g., a voice input of the user or an image of surroundings) that is collected through an information collection module 110, and may determine the user's intent, emotion, or situation, based on an analysis result. Furthermore, the electronic device 100 may provide user-desired information (e.g., an advertisement) at the right time, based on the user's intent, emotion, or situation.

Referring to FIG. 1, the electronic device 100 for providing the above-described functions may include the information collection module 110, a control module (or a processor) 130, an information output module 150, and an information storage module (or a memory) 170. However, a configuration of the electronic device 100 is not limited thereto. According to various embodiments, the electronic device 100 may not include at least one of the aforementioned elements and may further include at least one other element.

The information collection module 110 may collect information related to the user. For example, the information collection module 110 may collect speech uttered by the user or an image of surroundings of the user. The information collection module 110 may include, for example, a microphone 111 and a camera 113. The microphone 111 may convert vibration energy caused by the user's utterance into an electrical signal and may transmit the converted electrical signal to the control module 130. The camera 113 may take a still image and a moving picture. The camera 113 may include an image pickup device. The image pickup device may include at least one of a lens that receives image light of a subject to form an image, a diaphragm that adjust the amount of light passing through the lens, an image sensor that receives an image formed on the lens as an optical signal, a shutter that performs a function of opening/closing the diaphragm to expose the image sensor to light passing through the lens for a predetermined period of time, and an internal memory. The internal memory may temporarily store captured images. According to an embodiment, the internal memory may store an image taken through the image sensor before the shutter is operated.

The control module 130 (e.g., a processor) may analyze the user-related information collected through the information collection module 110. For example, the control module 130 may analyze the user's speech received through the microphone 111, or may analyze the image of the surroundings of the user, which is obtained through the camera 113.

According to an embodiment, the control module 130 may perform voice recognition on the received voice input. The control module 130 may analyze voice data corresponding to the voice input received through the microphone 111 and may convert the voice data into a text format. For example, in the case where the user utters "HI", the microphone 111 may convert vibration energy caused by the user's utterance into an electrical signal and may transmit the converted electrical signal to the control module 130. Furthermore, the control module 130 may convert the received electrical signal into frequency spectrum information corresponding thereto and may compare the converted frequency spectrum information with frequency spectrum information corresponding to various letters stored in the information storage module 170 to discern letters (e.g., "H" and "I") that correspond to the converted frequency spectrum information.

According to an embodiment, the control module 130 may perform voice print recognition on the received voice input. The control module 130 may perform the voice print recognition in substantially the same way as the voice recognition. Meanwhile, in the case of the voice print recognition, the control module 130 may user frequency spectrum information according to the user's speech stored in the information storage module 170. For example, in the case where the user utters "HI", voice recognition may simply discern letters (e.g., "I" and "I") included in the speech, whereas voice print recognition may discern which user utters "HI".

According to an embodiment, the control module 130 may detect an object included in the obtained image. For example, the control module 130 may extract feature points from the image and may detect a shape (e.g., an omega shape) indicated by adjacent feature points, among the feature points, as an object (e.g., a face). The feature points may be, for example, points that represent a feature of the image to detect, track, or recognize the object in the image and may include points that are easily distinguishable despite a change in the shape, size, or position of each object in the image. Furthermore, the feature points may include points that are easily distinguishable in the image even though the camera angle or lighting changes. The feature points may be set as, for example, corner points or boundary points of each object.

According to an embodiment, the control module 130 may distinguish between objects forming the image. The control module 130 may determine attributes of the respective objects to distinguish between the objects. For example, the control module 130 may determine whether the corresponding objects are a person, an animal, or a body. In addition, the control module 130 may determine a part (e.g., a face) of a person's body, the type of animal, or the type of body to distinguish the objects.

According to an embodiment, in the case where the object is a person's face, the control module 130 may analyze colors and positions of feature points corresponding to the region around the person's eyes, the zygomatic region, or the region around the person's lips to analyze the person's expression. In addition, the control module 130 may determine the person's emotion through person's expression. That is, the detected features in the person's face could, for example, be compared to a database in which a combination of prestored features are pre-mapped to a number of possible emotional states. Thus, a possible emotional state and the like may be identified from the database, based on an analysis and comparison of the person's facial expressions with the mapping of the database. In another example, the control module 130 may determine the location where the image is taken, while distinguishing between objects included in the image. In the case where an object included in the image is a physical object, the control module 130 may determine the location where the image is taken based on identification of the object, by determining whether the object (e.g., TV, an air conditioner, or the like) is typically disposed within a living room (e.g., a refrigerator) in a kitchen. In some embodiments, the information storage module 170 may store location information of each body, and the control module 130 may determine the location where the image is taken, by using the location information of the body that is stored in the information storage module 170. Here, a database of physical objects and their standard characteristics can be prestored and mapping to identifiers (e.g., television, refrigerator) and typical locations (e.g., living room, kitchen). Thus, upon capturing an image of the physical object, the database can be queried using the detected physical characteristics of the object to identify the object and a possible environment in which the object is disposed.

According to an embodiment, the control module 130 may specify, as an identification target, at least one object included in the image and related to an object having specified characteristics. For example, the control module 130 may discern an object having a specified characteristic among the objects included in the image, while distinguishing between the objects. For example, the control module 130 may discern an object corresponding to the user's finger in the image of the user. In this case, the control module 130 may analyze the shape and location of the object to specify, as an identification target, at least one object at a location where the user points with his/her finger (or at a location adjacent to the user's finger). In another example, the control module 130 may discern an object corresponding to the user's hand in the image of the user. In this case, the control module 130 may analyze the shape and location of the object to specify, as an identification object, at least one object held by the user. Thereafter, the control module 130 may determine an attribute of at least one object specified as an identification target to discern the type of body that the corresponding object represents.

According to an embodiment, the control module 130 may determine the user's intent, emotion, or situation, based on the result obtained by analyzing the information collected through the information collection module 110. For example, the control module 130 may determine the user's emotion or situation by analyzing the user's speech received through the microphone 111 or by analyzing the image of the surroundings of the user, which is obtained through the camera 113. For example, in the case the user with his/her family in a living room utters "I am hungry" with a smile, the control module 130 may receive a voice input corresponding to "I am hungry" through the microphone 111 and may obtain an image of the user with the family through the camera 113. In this case, the control module 130 may perform voice recognition and an image analysis to determine that the user is hungry and to determine that the user needs food to eat together with the family to have a good time with the family.

According to an embodiment, the control module 130 may decide information to be provided, based on relevance to the collected information. For example, the control module 130 may decide highly relevant information as information to be provided, based on the result of the voice recognition and the image analysis. For example, in the case where information for identifying specific goods (e.g., the type or name of the goods) is included in the voice recognition result, the control module 130 may decide the information about the specific goods as information to be provided. In another example, in the case where an object corresponding to specific goods is included in the image analysis result, the control module 130 may decide information about the specific goods as information to be provided. In some embodiments, the control module 130 may also decide information to be provided, by using the location where the image is taken. For example, even though information for identifying specific goods is included in the voice recognition result, in the case where the specific goods are not available at the location, the control module 130 may not decide the information about the specific goods as information to be provided, or may decide information about other goods similar to the specific goods and available at the location, as information to be provided. For example, when the word "detergent" is included in the voice recognition result and the image analysis result shows that the location corresponds to a kitchen, the control module 130 may decide, as goods to be provided, "dishwashing detergent" among goods including "detergent" and may provide an advertisement related to "dishwashing detergent" to the user.

According to an embodiment, in the case where information about specific goods is obtained from a nearby external electronic device, the control module 130 may decide the information about the specific goods as information to be provided. For example, while receiving an advertisement for specific goods through media, such as TV, radio, or the like, the user may express an opinion that the user is willing to pay for the specific goods. For example, while listening to or watching an advertisement, the user may utter that the user wants to purchase an advertised article. In this case, the control module 130 may determine whether information about the specific goods is included in sound and/or a screen output from the media and may decide the information about the specific goods as information to be provided in the case where the information about the specific goods is included in the sound and/or the screen.

According to an embodiment, when deciding information to be provided, the control module 130 may use an information provision history stored in the information storage module 170. For example, in the case where there is a history of specific information received by the user in substantially the same intent, emotion, or situation as the already-determined intent, emotion, or situation of the user, the control module 130 may decide the specific information as information to be provided. For example, in the case where there is a history in which the user received an advertisement for pizza when the user was hungry, the control module 130 may decide the information about pizza as information to be provided.

According to an embodiment, after deciding information to be provided, the control module 130 may set an information provision condition to decide whether to provide the information. The information provision condition may include information for calculating, as a numerical value (e.g., percent (%)), a reference for deciding whether to provide information to the user. The information provision condition may include, for example, information for determining the tendency of the user's intent. The user's intent may include an affirmative, negative, or undecided intent. For example, when the control module 130 makes a query to the user, the control module 130 may determine that the user has an affirmative intent for the query, in the case where an affirmative word (e.g., "yes") is included in the user's speech. Furthermore, the control module 130 may determine that the user has a negative intent for the query, in the case where a negative word (e.g., "no") is included in the user's speech. Moreover, for other words, the control module 130 may determine that the user has an undecided intent for the query.

After determining the user's intent, the control module 130 may determine whether the information provision condition is attained. For example, the control module 130 may quantify the information provision condition (e.g., calculate an attained value), and when the attained value is greater than or equal to a specified magnitude, the control module 130 may determine that the user's intent is to receive information. In this regard, the control module 130 may increase the attained value when the user's intent is affirmative, may decrease the attained value when the user's intent is negative, and may maintain the attained value when the user's intent is not decided. Furthermore, the control module 130 may differently set an increment/decrement in the attained value, depending on the degree of tendency of the user's intent. For example, the control module 130 may increase an increment in the attained value in the case where a strong affirmative word (e.g., "of course") is included in the user's speech and may increase a decrement in the attained value in the case where a strong negative word (e.g., "of course not") is included in the user's speech. Furthermore, the control module 130 may analyze the user's tone or accent to determine the degree of tendency of the user's intent.

According to an embodiment, to determine the user's intent, the control module 130 may create and output a query for confirming whether to provide information. The control module 130 may provide the query to the user. Thereafter, when receiving an answer to the query from the user, the control module 130 may analyze the answer to determine whether the information provision condition is attained. In this case, the control module 130 may differently create and output the query depending on the magnitude of data (e.g., the attained value) obtained by quantifying the information provision condition. For example, the control module 130 may classify the attained value according to steps and may output, through the information output module 150, queries set according to the classified steps. The control module 130 may classify a basis for determining that the user wants to receive information into a plurality of steps and may differently set queries to ask the user, according to the steps. For example, the control module 130 may output a query close to an everyday conversation (e.g., a query less relevant to information to be provided) at a lower step and may output a query more highly relevant to information to be provided, toward a higher step. Also, the control module 130 may raise or lower the step depending on the tendency of the user's intent. For example, the control module 130 may raise the step to output a query highly relevant to information to be provided in the case where the user's intent is affirmative and may lower the step to output a query close to an everyday conversation in the case where the user's intent is negative.

For example, in the case the user with his/her family in a living room utters "I am hungry" with a smile, the control module 130 may perform voice recognition and an image analysis to determine that the user needs food to eat and may decide information to be provided (e.g., pizza discount information), based on an information provision history. Furthermore, the control module 130 may set an information provision condition to decide whether to provide information and may output a query associated with providing information through the information output module 150 to discern the tendency of the user's intent. When the user reacts to the query (e.g., a change of expression or an answer), the control module 130 may collect the reaction through the information collection module 110 and may analyze the collected information to calculate an attained value for the information provision condition. For example, the control module may increase the attained value when the user gives an affirmative answer to the query and may decrease the attained value when the user gives a negative answer to the query. In the case where the attained value is less than a specified magnitude (e.g., a first value), the control module may attempt an everyday conversation irrelevant to the determined information (e.g., pizza discount information). Furthermore, in the case where the attained value is greater than or equal to a specified magnitude (e.g., a second value), the control module 130 may provide the determined information to the user through the information output module 150. For example, the control module 130 may output a display object corresponding to the information on a display 153, or may output sound corresponding to the information through a speaker 151. In some embodiments, in the case where the attained value is greater than or equal to the specified magnitude (e.g., the second value), the control module 130 may also output a query to receive, from the user, a definite answer to whether the user wants to receive the determined information. For example, the control module 130 may provide, to the user, a query for confirmation, such as "Do you want to receive an advertisement for ~?" In another example, in the case where the attained value is greater than or equal to the first value, but is less than the second value, the control module 130 may output again another query for confirming whether to provide information, through the information output module 150. Consequently, until the attained value becomes less than the first magnitude or greater than or equal to the second magnitude, the control module 130 may output at least one query for confirming whether to provide information, through the information output module.

According to an embodiment, when the user's intent, emotion, or situation is determined, the control module 130 may decide a conversation category, based on the determination result and may decide information to be provided in relation to the category. Furthermore, the control module 130 may select one of queries classified according to categories and stored in the information storage module 170 and may output the selected query through the information output module 150. In this regard, the queries classified and stored according to categories may be classified according to steps depending on an attained value of an information provision condition (e.g., classified according to the degree of relevance to information to be provided) and may be stored and managed in the information storage module 170. For example, in the case where the user is hungry, the control module 130 may decide, as "food", the category of the information to be provided, may select one of queries related to "food" and stored in the information storage module 170 according to the attained value of the information provision condition, and may provide the selected query to the user through the information output module 150. Thereafter, the control module 130 may collect the user's reaction to the query, may calculate an attained value of the information provision condition according to an analysis result of the reaction, and may perform processing that corresponds to the magnitude of the attained value. For example, in the case where the attained value is less than a specified magnitude (e.g., a first magnitude), the control module 130 may output another query beyond the category through the information output module 150 for an everyday conversation, or may output a low-level query included in the same category through the information output module 150 for continuity of conversation. In another example, in the case where the attained value is greater than or equal to a specified magnitude (e.g., a second magnitude), the control module 130 may output a query to receive, from the user, a definite answer to whether the user wants to receive the determined information. In another example, in the case where the attained value is greater than or equal to the first magnitude, but is less than the second magnitude, the control module 130 may select another query for confirming whether to provide information, for example, a different query included in the same category and may output the selected query through the information output module 150.

The information output module 150 may output information to be provided to the user. The information output module 150 may include, for example, the speaker 151 for outputting sound corresponding to the information and the display 153 for outputting a display object (e.g., text, an image, or a video) that corresponds to the information. However, a configuration of the information output module 150 is not limited thereto. According to various embodiments, the information output module 150 may not include one of the aforementioned elements and may further include at least one other element.

The speaker 151, which is an audio output device, may output sound. For example, the speaker 151 may convert an electrical signal into vibration to emit sound waves into the air. According to an embodiment, the speaker 115 may be mounted on a printed circuit board disposed inside a housing of the electronic device 100, or may be physically separated from the printed circuit board and electrically connected with the printed circuit board.

The display 153 may display various types of contents (e.g., text, an image, a video, an icon, a symbol, or the like) to the user. According to an embodiment, the display 153 may include a touch screen. For example, the display 153 may receive a touch, gesture, proximity, or hovering input using an electronic pen or a part of the user's body.

The information storage module 170 (e.g., a memory) may store one or more instructions or data related to at least one other element of the electronic device 100. According to an embodiment, the information storage module 170 may store software and/or a program. For example, the information storage module 170 may store an application associated with providing information. The application associated with providing information may include, for example, an instruction for collecting information related to a user (e.g., a voice input of the user or an image of surroundings) through the information collection module 110, an instruction for analyzing the collected information, an instruction for determining the user's intent, emotion, or situation, based on a result obtained by analyzing the information, an instruction for selecting (or deciding) user-desired information, based the user's intent, emotion, or situation, an instruction for providing the selected information to the user through the information output module 150, and the like. The instructions may be loaded into a volatile memory by the control module 130 and may be processed according to a specified program routine.

According to an embodiment, the information storage module 170 may store frequency spectrum information corresponding to various letters or frequency spectrum information according to the user's speech. Furthermore, the information storage module 170 may store location information about at least one body. Also, the information storage module 170 may store information about a history of information provided at least once or more. In some embodiments, the control module 130 may receive information (e.g., an advertisement) to be provided, from an external electronic device (e.g., a server device of an advertisement service provider) through a communication module (or a communication circuit) and may store the received information in the information storage module 170.

As described above, according to various embodiments, an electronic device (e.g., the electronic device 100) may include a microphone (e.g., the microphone 111), a camera (e.g., the camera 113), an information output module (e.g., the information output module 150), a memory (e.g., the memory the information storage module 170) configured to store first data related to at least one of an intent, an emotion, and a situation of a user, second data related to a reaction of the user, and queries classified according to a category of a conversation, and a processor (e.g., the control module 130) electrically connected with the microphone, the camera, and a memory. The memory may store instructions that, when executed, cause the processor to receive a first voice input of the user through the microphone, obtain an image of the user and surroundings of the user through the camera, and analyze the first voice input and the image, determine at least one of the user's intent, emotion, and situation based on a result obtained by comparing an analysis result of the first voice input and the image with the first data stored in the memory, decide a category of a conversation based on at least one of the user's determined intent, emotion, and situation, and decide first information to be provided to the user in relation to the category, select a first query for confirming whether to provide the first information to the user from first queries included in the category among the queries stored in the memory, output the first query though the information output module, collect a first reaction of the user to the first query through at least one of the microphone and the camera, and determine a condition for deciding whether to provide the first information to the user, based on a result obtained by comparing an analysis result of the first reaction with the second data stored in the memory, and output a second query through the information output module to receive a definite answer for provision of the first information from the user if the condition is satisfied, collect a second reaction of the user to the second query through at least one of the microphone and the camera, and decide whether to provide the first information to the user, based on a result obtained by comparing an analysis result of the second reaction with the second data.

According to various embodiments, the memory may store instructions that, when executed, cause the processor to analyze the first voice input by performing at least one of voice recognition and voice print recognition on the first voice input, and compare at least one word included in a result of at least one of the voice recognition and the voice print recognition with the first data.

According to various embodiments, the memory may store instructions that, when executed, cause the processor to extract at least one object from the image, identify the at least one extracted object, and compare the at least one identified object with the first data.

According to various embodiments, the memory may store instructions that, when executed, cause the processor to decide the first information by additionally using at least one of an age of the user, a gender of the user, physical information of the user, a type of brand preferred by the user, and history information of a plurality of pieces of information provided to the user that are stored in advance in the memory.

According to various embodiments, the memory may store instructions that, when executed, cause the processor to calculate a tendency of the user's intent for the first query as numerical data, based on the analysis result of the first reaction, and determine that the condition is satisfied when the numerical data is greater than or equal to a first magnitude.

According to various embodiments, the memory may store instructions that, when executed, cause the processor to determine whether the first reaction to the first query has an affirmative intent, a negative intent, or an undecided intent, increase the numerical data by a predetermined magnitude when the first reaction has the affirmative intent, decrease the numerical data by a predetermined magnitude when the first reaction has the negative intent, and maintain the numerical data when the first reaction has the undecided intent.

According to various embodiments, the memory may store instructions that, when executed, cause the processor to perform at least one of voice recognition and voice print recognition on a second voice input received through the microphone and corresponding to the first reaction, determine whether a word included in a result of at least one of the voice recognition and the voice print recognition of the second voice input is an affirmative word, a negative word, or an undecided word, according to a classification criterion stored in advance in the memory, determine that the first reaction has the affirmative intent when the word is the affirmative word, determine that the first reaction has the negative intent when the word is the negative word, and determine that the first reaction has the undecided intent when the word is the undecided word.

According to various embodiments, the memory may store instructions that, when executed, cause the processor to determine that the condition is not satisfied when the numerical data is less than a second magnitude, and select a third query of which relevance to the first information is less than a specified magnitude, from the first queries included in the category and output the third query through the information output module.

According to various embodiments, the memory may store instructions that, when executed, cause the processor to select a fourth query of which relevance to the first information is greater than or equal to the specified magnitude, from the first queries included in the category to confirm whether to provide the first information to the user when the numerical data is greater than or equal to the second magnitude and less than the first magnitude, and output the fourth query through the information output module.

According to various embodiments, the memory may store instructions that, when executed, cause the processor to output the first information through the information output module when it is decided that the first information is provided.

Figure 2:
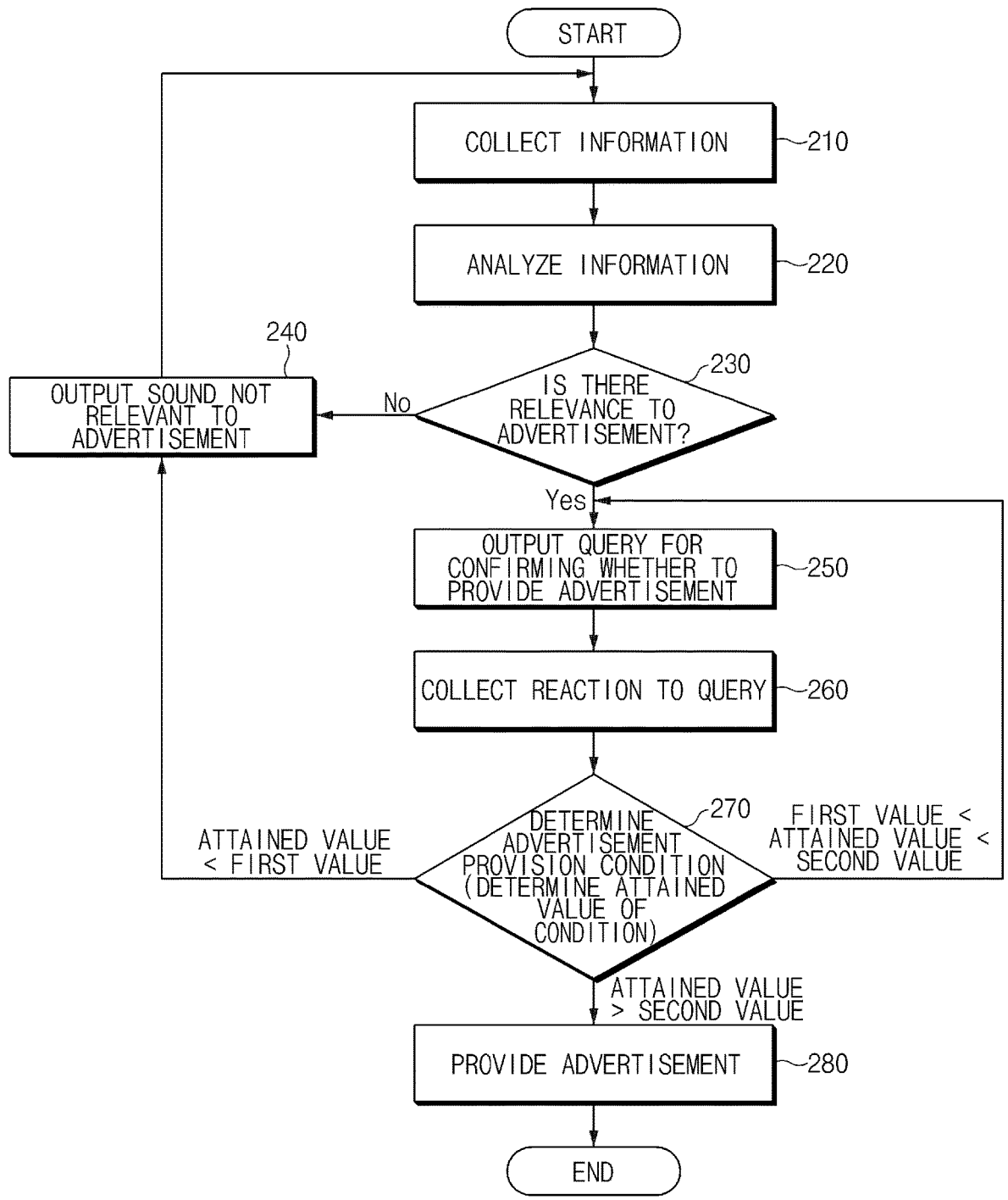
FIG. 2 is a flowchart illustrating an electronic device operating method associated with providing an advertisement according to an embodiment.

FIG. 2 is a flowchart illustrating an electronic device operating method associated with providing an advertisement according to an embodiment.

An electronic device (e.g., the electronic device 100) may determine whether a user wants to receive information (e.g., such as an advertisement), by receiving a voice input of the user or capturing an image of surroundings of the user before providing the information (e.g., the advertisement) to the user and then determining an intent, an emotion, or a situation of the user through an analysis of the collected information. Accordingly, the electronic device may provide information to the user at the right time when it is determined the user desires to receive the pertinent information.

Referring to FIG. 2, in operation 210, the control module 130 may collect information related to the user through the information collection module 110. For example, the control module 130 may receive a voice input of the user through the microphone 111, and/or may obtain an image of the user and surroundings of the user through the camera 113.

In operation 220, the control module 130 may analyze the information collected through the information collection module 110. The control module 130 may perform voice recognition and/or voice print recognition on the received voice input. For example, the control module 130 may analyze voice data corresponding to the received voice input to discern text included in the voice input and to discern which of a number of known user uttered the speech. Furthermore, the control module 130 may detect an object included in the obtained image and determine whether the detected object is a person, an animal, or a body. In addition, the control module 130 may determine a part (e.g., face) of the person's body, the type of animal, or the type of object. In the case where the object is a person's face, the control module 130 may analyze an expression of the person and may determine an emotion of the person through the expression of the person. In the case where the object is a body, the control module 130 may determine the location where the image is taken, by using location information of each object that is stored in the information storage module 170.

In operation 230, the control module 130 may identify the user's intent, emotion, or situation, based on the result obtained by analyzing the collected information and may determine whether the intent, emotion, or situation of the user is relevant to information (e.g., an advertisement) to be provided. For example, the control module 130 may determine whether the intent, emotion, or situation of the user is satisfied by providing an advertisement, using methods previously described above. Thus, when determining that a detected facial expression indicates or corresponds to a user state of hunger, the control module 130 may determine that the user's situation is highly relevant to an advertisement for food based on a predefined association of the emotional state "hunger" with "food" category advertisements in, for example, a database thereof. Naturally, a plurality of identifiable emotional states may be mapped to a plurality of advertisement categories in addition to those mentioned here. In another example, in the case where the user utters that specific goods are desired, the control module 130 may determine that the user's utterance intent is highly relevant to an advertisement for the specific goods.

In the case where the user's intent, emotion, or situation is less relevant or irrelevant to information (e.g., an advertisement) to be provided, the control module 130 may, in operation 240, output information (e.g., speech, such as an everyday conversation, a joke, or the like) less relevant to the information (e.g., advertisement) through the information output module 150. As described above, a "lesser" degree of relevance may be based on a negative user voice response to an output query. Thus, for example, the control module 130 may output, through the speaker 151, speech set for an everyday conversation that is otherwise irrelevant to the advertisement.

In the case where the user's intent, emotion, or situation is determined to be relevant to information (e.g., an advertisement), in operation 250, the control module 130 may output a query prompting a user to confirm whether to provide information (e.g., an advertisement), through the information output module 150. For example, the control module 130 may set a numerical value (e.g., an attained value) for attaining an information provision condition to a specific value (e.g., 50%) to decide whether to provide information and may create and output a query utilized for the attained value to satisfy a specified value (e.g., 90%). In this case, the control module 130 may differently create and output the query depending on the magnitude of the attained value. For example, the control module 130 may classify the attained value according to steps and may output, through the information output module 150, queries set according to the classified steps.

In operation 260, the control module 130 may aggregate data pertaining to the user's reaction to the query through the information collection module 110. For example, the control module 130 may receive the user's answer to the query through the microphone 111, and/or may obtain an image of the user or surroundings of the user through the camera 113 after outputting the query. Furthermore, the control module 130 may determine a change of the user's expression by performing voice recognition and/or voice print recognition on the received answer and analyzing the image.

In the case where an affirmative word (e.g., "yes") is included in the user's speech, the control module 130 may determine that the user has an affirmative intent for the query, and in the case where a negative word (e.g., "no") is included in the user's speech, the control module 130 may determine that the user has a negative intent for the query. Furthermore, through the user's expression, the control module 130 may determine that the user has an affirmative or negative intent for the query.

After the user's intent is determined, the control module 130 may increase the attained value by a predetermined magnitude (e.g., 25%) when the user's intent is affirmative and may decrease the attained value by a predetermined magnitude (e.g., 25%) when the user's intent is negative. In some embodiments, the control module 130 may increase an increment in the attained value in the case where a strong affirmative word (e.g., "of course") is included in the user's speech and may increase a decrement in the attained value in the case where a strong negative word (e.g., "of course not") is included in the user's speech. For example, the control module 130 may increase the attained value by an increment (e.g., 50%) greater than the predetermined magnitude when the user's intent is strong affirmative and may decrease the attained value by a decrement (e.g., 50%) greater than the predetermined magnitude when the user's intent is strong negative. Thus, an association may be created between certain pre-determined responses such as "of course," "of course not," and other such phrases and a degree to increment or decrement a valuation of a user's intent.

In operation 270, the control module 130 may determine whether the information provision condition is attained. That is, for example, the control module 130 may determine whether an aggregated value obtained by quantifying the information provision condition satisfies or attains to a pre-specified value (e.g., 90%) in order to trigger display of the advertisement.

In the case where the attained value is less than a first prespecified value (e.g., 10%), the control module 130 may, in operation 240, output sound less or not relevant to the information (e.g., advertisement) through the speaker 151, such as speech pertinent to everyday conversation which may be generated via algorithm. In the case where the attained value is greater than or equal to a second prespecified value (e.g., 90%), the control module 130 may, in operation 280, provide the information (e.g., advertisement) to the user through the information output module 150. In some embodiments, in the case where the attained value is greater than or equal to the second value, the control module 130 may also output a query to receive, from the user, a definite answer to whether the user wants to receive the information. For example, the control module 130 may provide, to the user, a query for confirmation, such as "Do you want to receive an advertisement for ~?" Thereafter, the control module 130 may perform operation 280 in the case where the user's reaction to the query for confirmation has an affirmative intent.

According to an embodiment, in the case where the attained value is greater than or equal to the first value and less than the second value, the control module 130 may return to operation 250 to output, through the information output module 150, another query for confirming whether to provide information. Thereafter, the control module 130 may repeatedly perform operations 250 to 270 until the attained value becomes less than the first value or greater than or equal to the second value.

Figure 3:
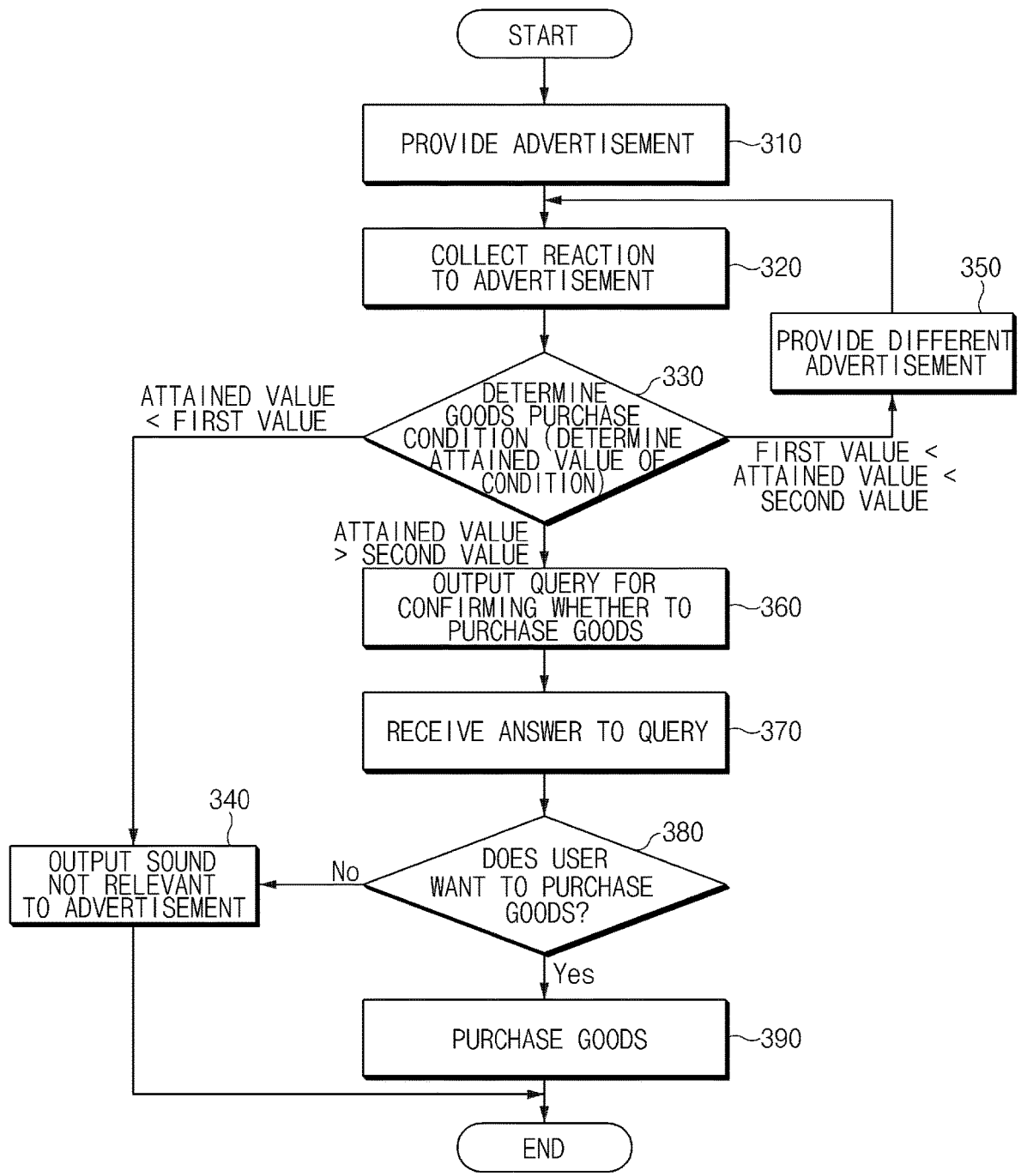
FIG. 3 is a flowchart illustrating an electronic device operating method associated with purchase of goods according to an embodiment.

FIG. 3 is a flowchart illustrating an electronic device operating method associated with purchase of goods according to an embodiment.

An electronic device (e.g., the electronic device 100) may provide information (e.g., an advertisement) to a user and may then collect the user's reaction to the information to determine the user's intention for purchase of goods. For example, the electronic device may provide an advertisement, may collect the user's reaction to the advertisement (e.g., the user's voice input or image) through the information collection module 110, and may determine the user's intent, emotion, or situation through an analysis of the collected information, thereby determining whether the user wants to purchase goods.

Referring to FIG. 3, in operation 310, the control module 130 may provide information (e.g., an advertisement) to the user through the information output module 150. For example, the control module 130 may output a display object related to specific goods on the display 153, or may output sound related to the specific goods through the speaker 151.

In operation 320, the control module 130 may collect the user's reaction to the provided information (e.g., advertisement) through the information collection module 110. For example, the control module 130 may receive the user's voice input responsive to the advertisement through the microphone 111, or may obtain an image of the user and surroundings of the user through the camera 113. Furthermore, the control module 130 may analyze the information collected through the information collection module 110. For example, the control module 130 may perform voice recognition and/or voice print recognition on the received voice input. In another example, the control module 130 may perform an image analysis on the obtained image. Also, the control module 130 may determine the user's intent, emotion, or situation, based on a result obtained by analyzing the collected information.

In operation 330, the control module 130 may determine whether a goods purchase condition set for deciding whether to purchase goods is attained based on the collected user reaction information. For example, the control module 130 may determine whether an attained value obtained by quantifying the goods purchase condition satisfies a specified value. In this regard, the goods purchase condition may include information for calculating a reference for deciding whether to purchase goods as a numerical value. For example, the goods purchase condition may include information for determining the tendency of the user's goods purchase intent.

Based on the analysis result of the reaction to the advertisement, the control module 130 may, in operation 340, output information (e.g., an everyday conversational phrases, a joke, or the like) less or not relevant to an advertisement through the information output module 150 when the attained value is less than a first value. In the case where the attained value is greater than or equal to a second value, the control module may, in operation 360, output a query prompting the user to indicate a definite answer on whether they wish to purchase the goods and products indicated by the advertisement.

In operation 370, the control module 130 may receive the user's answer to the query for confirmation through the information collection module 110. In some embodiments, for an important decision, such as affirmatively purchasing goods, the control module 130 may refrain from proceeding with the purchase until a definite answer is received from the user. For example, the control module 130 may proceed with purchase of goods after the user directly gives an affirmative answer (e.g., when the user utters a purchase command phrase, such as "Purchase specific goods"), and does not attempt determining the user's intent with the user's expression absent explicit confirmation.

In operation 380, the control module 130 may determine whether the user wants to purchase goods, based on the received user answer. For example, in the case where an affirmative word is included in a result obtained by performing voice recognition and/or voice print recognition on the user's answer, the control module 130 may determine that the user wants to purchase goods. Alternatively, in the case where a negative word is included in the result, the control module 130 may determine that the user does not want to purchase goods.

When it is determined that the user does not want to purchase goods, in operation 340, the control module 130 may output information (e.g., sound) less or not relevant to the advertisement through the information output module 150, such as a selection of some predefined and prestored conversational speech and bantering. When it is determined that the user wants to purchase goods, the control module 130 may, in operation 390, proceed with purchase of the goods.

According to an embodiment, based on the analysis result of the reaction to the advertisement, the control module 130 may, in operation 350, provide an advertisement different from the advertisement in the case where the attained value is greater than or equal to the first value and less than the second value. For example, the control module 130 may provide a different advertisement for the goods. In another example, the control module 130 may provide an advertisement for a similar type of goods. Thereafter, the control module 130 may repeatedly perform operations 320, 330, and 350 until the attained value becomes less than the first value or greater than or equal to the second value.

Figure 4:
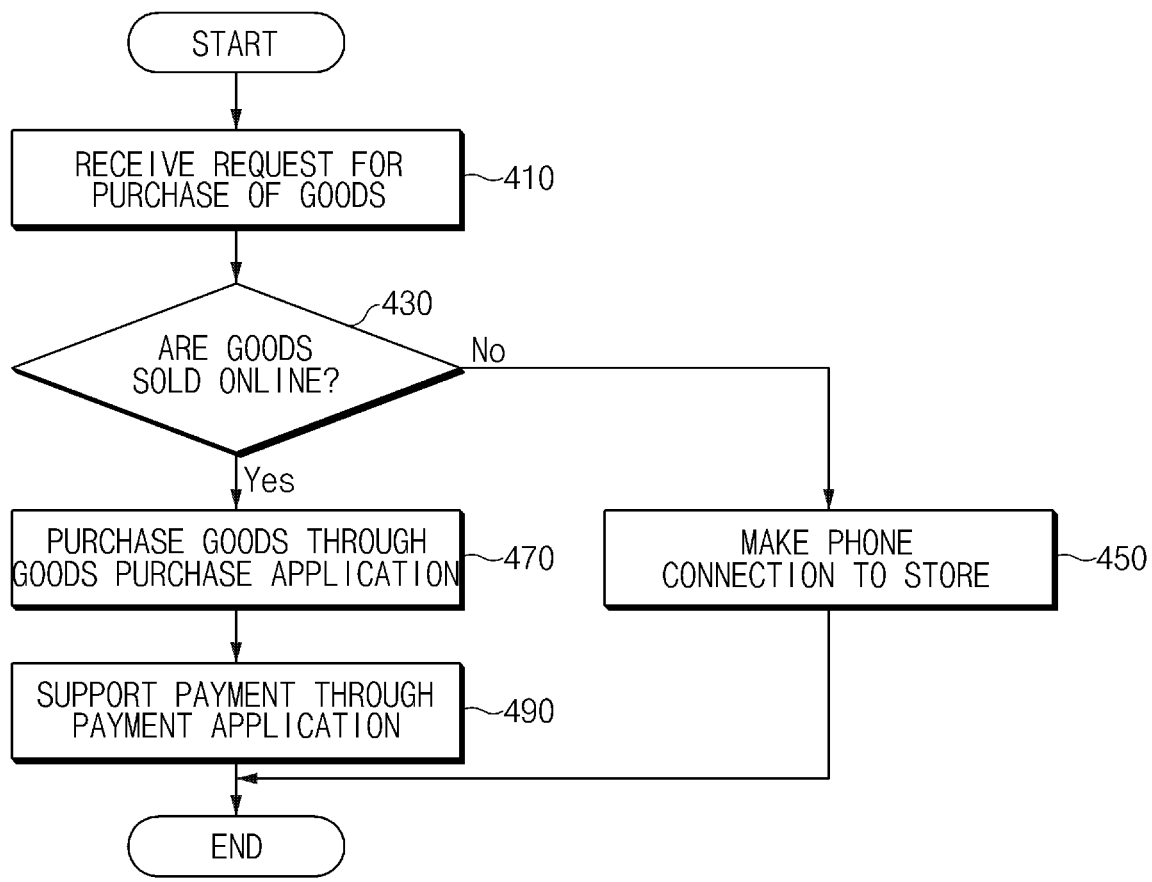
FIG. 4 is a flowchart illustrating an electronic device operating method associated with a method for proceeding with purchase of goods according to an embodiment.

FIG. 4 is a flowchart illustrating an electronic device operating method associated with a method for proceeding with purchase of goods according to an embodiment.

When receiving a request for purchase of goods from a user, an electronic device (e.g., the electronic device 100) may provide different methods depending on the type of goods and purchase routes for the goods.

Referring to FIG. 4, in operation 410, the control module 130 may receive a request to purchase some goods from the user. According to an embodiment, the control module 130 may receive, for example, a user voice input requesting purchase of the goods through the microphone 111. Alternatively, may receive a request for purchase of goods through a button input for confirming the purchase of goods.

In operation 430, the control module 130 may determine whether the products that were requested are sold online (e.g., on an Internet-based retailer website). For example, the control module 130 may discern the type of goods and may identify a purchase 'route' for the goods, such as purchase through one or more retailer websites.

In the case where the goods are not sold online, the control module 130 may, in operation 450, identify a physical store that sells the product, retrieve any necessary contact information for the store, and initiate a telephone connection to the identified store.

In the case where the goods are sold online, the control module 130 may, in operation 470, execute purchase of the goods through a relevant application. For example, the control module 130 may execute an application that supports purchase of the goods, such as a web browser, and access an online shopping website selling the goods, depending on a program routine of the goods purchase application to proceed with purchase of goods.

In the case where the electronic device has a payment application installed therein, the control module 130 may, in operation 490, support payment for the goods through the payment application. However, in the case where a payment application is not installed in the electronic device, the control module 130 may ignore performing of operation 490, or recommend that the user install a suitable payment application.

As described above, according to various embodiments, a method for providing information by an electronic device (e.g., the electronic device 100) may include receiving a first voice input of a user through a microphone, obtaining an image of the user and surroundings of the user through a camera, analyzing the first voice input and the image, comparing an analysis result of the first voice input and the image with first data stored in advance in a memory and related to at least one of an intent, an emotion, and a situation of the user, determining at least one of the user's intent, emotion, and situation, based on a result obtained by comparing the analysis result of the first voice input and the image with the first data, deciding a category of a conversation, based on at least one of the user's determined intent, emotion, and situation, deciding first information to be provided to the user in relation to the category, selecting a first query for confirming whether to provide the first information to the user from first queries included in the category among queries stored in advance in the memory and classified according to a category of a conversation, outputting the first query through an information output module, collecting a first reaction of the user to the first query through at least one of the microphone and the camera, determining a condition for deciding whether to provide the first information to the user, based on a result obtained by comparing an analysis result of the first reaction with second data stored in advance in the memory and related to the user's reaction, outputting a second query through the information output module to receive a definite answer for provision of the first information from the user if the condition is satisfied, collecting a second reaction of the user to the second query through at least one of the microphone and the camera, and deciding whether to provide the first information to the user, based on a result obtained by comparing an analysis result of the second reaction with the second data.

According to various embodiments, the analyzing of the first voice input and the image may include analyzing the first voice input by performing at least one of voice recognition and voice print recognition on the first voice input, and the comparing of the analysis result of the first voice input and the image with the first data may include comparing at least one word included in a result of at least one of the voice recognition and the voice print recognition with the first data.

According to various embodiments, the analyzing of the first voice input and the image may include extracting at least one object from the image, and identifying the at least one extracted object, and the comparing of the analysis result of the first voice input and the image with the first data may include comparing the at least one identified object with the first data.

According to various embodiments, the deciding of the first information may include deciding the first information by additionally using at least one of an age of the user, a gender of the user, physical information of the user, a type of brand preferred by the user, and history information of a plurality of pieces of information provided to the user that are stored in advance in the memory.

According to various embodiments, the determining of the condition may include calculating a tendency of the user's intent for the first query as numerical data, based on the analysis result of the first reaction, and determining that the condition is satisfied when the numerical data is greater than or equal to a first magnitude.

According to various embodiments, the calculating of the numerical data may include determining whether the first reaction to the first query has an affirmative intent, a negative intent, or an undecided intent, increasing the numerical data by a predetermined magnitude when the first reaction has the affirmative intent, decreasing the numerical data by a predetermined magnitude when the first reaction has the negative intent, and maintaining the numerical data when the first reaction has the undecided intent.

According to various embodiments, the determining of whether the first reaction to the first query has the affirmative intent, the negative intent, or the undecided intent may include performing at least one of voice recognition and voice print recognition on a second voice input received through the microphone and corresponding to the first reaction, determining whether a word included in a result of at least one of the voice recognition and the voice print recognition of the second voice input is an affirmative word, a negative word, or an undecided word, according to a classification criterion stored in advance in the memory, determining that the first reaction has the affirmative intent when the word is the affirmative word, determining that the first reaction has the negative intent when the word is the negative word, and determining that the first reaction has the undecided intent when the word is the undecided word.

According to various embodiments, the method may further include determining that the condition is not satisfied when the numerical data is less than a second magnitude, selecting a third query of which relevance to the first information is less than a specified magnitude, from the first queries included in the category, and outputting the third query through the information output module.

According to various embodiments, the method may further include selecting a fourth query of which relevance to the first information is greater than or equal to the specified magnitude, from the first queries included in the category to confirm whether to provide the first information to the user when the numerical data is greater than or equal to the second magnitude and less than the first magnitude, and outputting the fourth query through the information output module.

According to various embodiments, the method may further include outputting the first information through the information output module when it is decided that the first information is provided.

Figure 5:
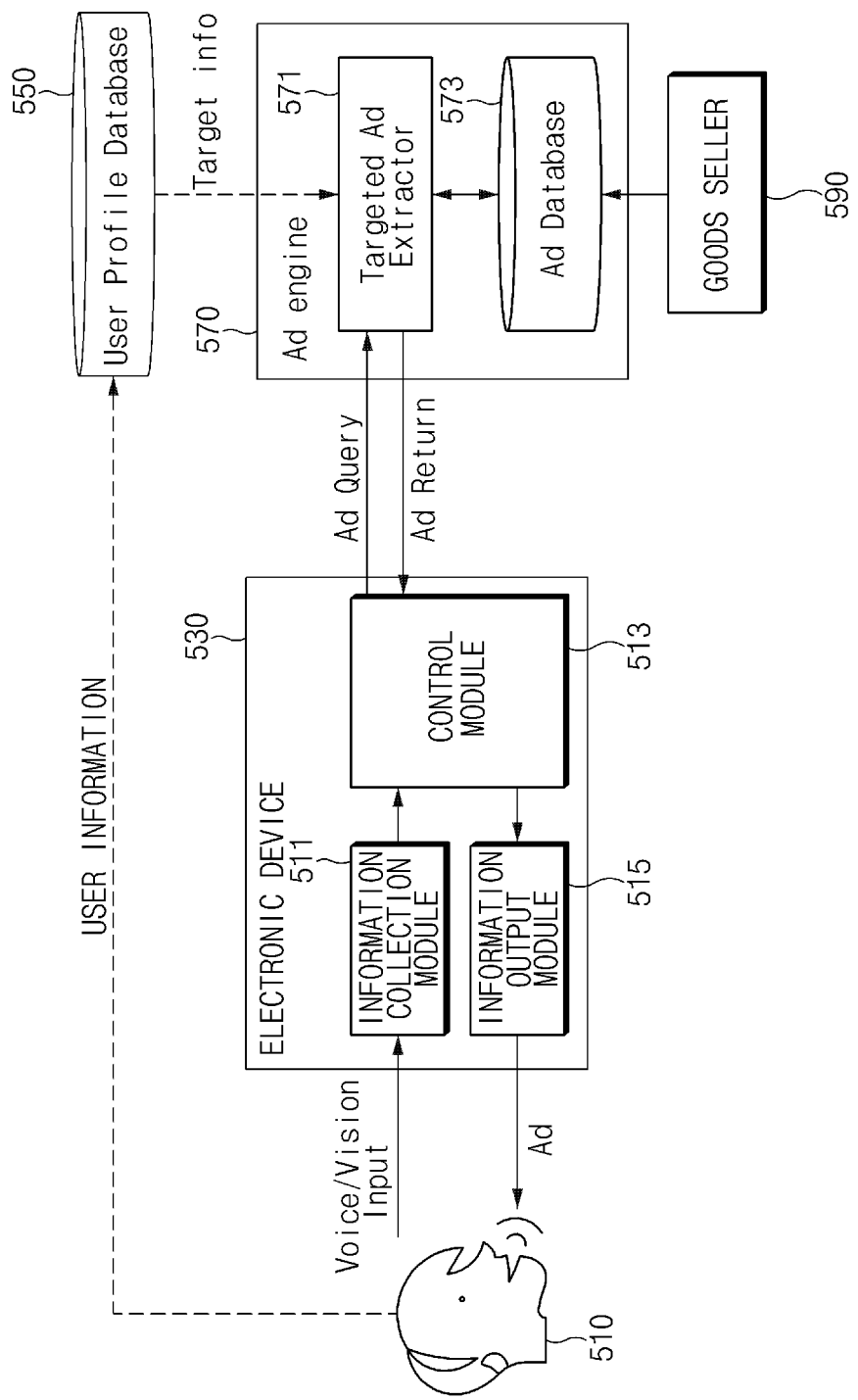
FIG. 5 is a view for explaining a system operating method associated with providing an advertisement according to an embodiment.

FIG. 5 is a view for explaining a system operating method associated with providing an advertisement according to an embodiment.

Referring to FIG. 5, an electronic device 530 (e.g., the electronic device 100) may obtain information related to a user 510, for example, a voice input of the user 510 and an image (a vision input) of surroundings that include the user 510, through an information collection module 511 (e.g., the information collection module 110). At this time, a control module 513 may control a function of the information collection module 511 and may process the voice input information and the image information obtained through the information collection module 511.

According to an embodiment, the control module 513 may determine an intent, an emotion, or a situation of the user 510 by analyzing the voice input information and the image information obtained through the information collection module 511. For example, the control module 513 may perform voice recognition and/or voice print recognition on the voice input information and may extract a word (e.g., an instruction) included in the voice input information. Furthermore, the control module 513 may compare the word with information about meanings of various words stored in advance in an information storage module (or a memory) (e.g., the information storage module 170) to identify the meaning of the word. For example, the information storage module may store the word "hungry" and the meaning "wanting to eat something" mapped onto the word "hungry", and if voice recognition and/or voice print recognition shows that the word "hungry" is included in the voice input of the user 510, the control module 513 may determine that the user 510 is hungry at present. Furthermore, a reception state of the word "hungry" or a function to be performed in a state in which the user 510 is hungry (e.g., a function of outputting an advertisement for food) may be set and stored in advance in the information storage module, and the control module 513 may perform the function when determining that the intent of the user 510 is to relieve hunger.

In another example, the control module 513 may perform an image analysis on the image information (e.g., extract or identify an object) and may determine an emotional state or a situation of the user 510 by using characteristics of an object (e.g., the user 510, a person with the user 510, an object, or the like) that is included in the image. At this time, the control module 513 may use the type of emotion according to an expression, the location of an object, or the like that is stored in advance in the information storage module. For example, in the case where the object is the face of the user 510, the control module 513 may determine an expression of the user 510 by analyzing the shape of the object and may identify an emotional state according to the expression of the user 510. Furthermore, in the case where the object is a body, the control module 513 may identify the location where the image is taken, by using the location of the body. When the emotion or location of the user 510 is identified, the control module 513 may more clearly determine the intent of the user 510. For example, even though the user 510 utters speech including the word "hungry", the intent of the user 510 may be differently recognized depending on the emotion or location of the user 510. For example, in the case where the user 510 utters "I am hungry" while doing an exercise using fitness equipment, the control module 513 may determine that the utterance of the user 510 is intended to hear words of encouragement, but not to relieve hunger. In this case, the control module 513 may select speech that is able to be output in an encouragement state, which is stored in advance in the information storage module, and may output the selected speech through an information output module 515.

According to an embodiment, when it is determined that a function to be performed based on an intent, an emotion, or a situation of the user 510 is to provide an advertisement for specific goods, the control module 513 may request advertisement information for the specific goods from an advertisement providing server 570 connected with the electronic device 530 via a communication circuit. The advertisement providing server 570 may be, for example, a device that stores advertisements registered by a goods seller 590. The advertisement providing server 570 may be a device directly operated by the goods seller 590 or a device operated by a contents provider that receives a request from the goods seller 590 to provide advertisements. In some embodiments, the electronic device 530 may not be provided with advertisement information by the advertisement providing server 570 connected thereto via the communication circuit, but may store the advertisement information in the information storage module included in the electronic device 530. For example, the control module 513 may receive advertisement information for various types of goods periodically or by a request from the goods seller 590 or the advertisement providing server 570 and may store the advertisement information in the information storage module.

When receiving a request for advertisement information for specific goods from the electronic device 530, the advertisement providing server (or Ad engine) 570 may determine whether advertisement information for the specific goods exists in an Ad database 573, through a goods search module (or targeted Ad extractor) 571. In some embodiments, the goods search module 571 may use information about the user 510 while searching for advertisement information for the specific goods. For example, the goods search module 571 may determine whether the user 510 has a preferred brand, by using the information about the user 510 and may preferentially search for advertisement information of a brand preferred by the user 510. In another example, the goods search module 571 may identify history information for an advertisement provided to the user 510, by using the information about the user 510 and may preferentially search for recently-provided advertisement information or most frequently-provided advertisement information for the specific goods. In this regard, the information about the user 510 may be stored and managed in a user profile database 550. The user profile database 550 may store various types of information about the user 510, for example, the age, gender, physical information, preferred brand, or advertisement provision history of the user 510, as well as identification information of the user 510 (e.g., the name, telephone number, or ID of the user 510). According to an embodiment, the user profile database 550 may be included in an external server connected with the electronic device 530 via the communication circuit, or may be stored in the information storage module of the electronic device 530.

When receiving advertisement information for the specific goods from the advertisement providing server 570, the control module 513 may provide an advertisement for the specific goods to the user 510 through the information output module 515. For example, the control module 513 may output the advertisement information through a display (e.g., the display 153). In another example, the control module 513 may output the advertisement information through the speaker 151.

Figure 6:
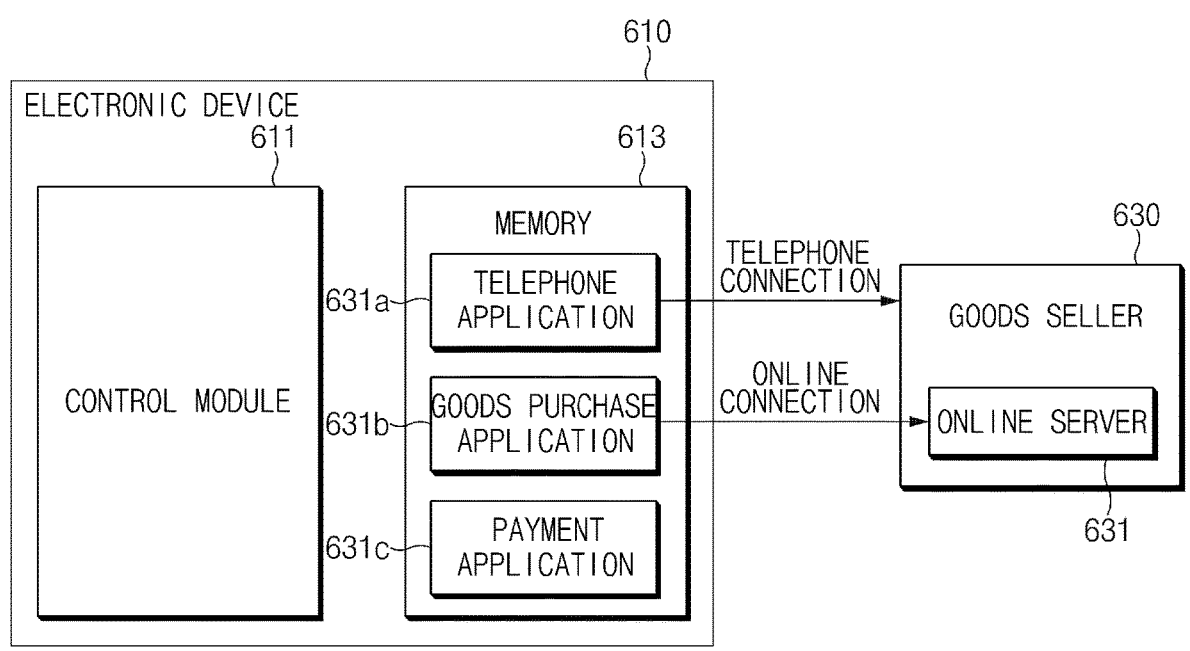
FIG. 6 is a view for explaining a system operating method related to purchase of goods according to an embodiment.

FIG. 6 is a view for explaining a system operating method related to purchase of goods according to an embodiment.

Referring to FIG. 6, an electronic device 610 (e.g., the electronic device 100 or 530) may receive a request for purchase of specific goods from a user (e.g., the user 510). For example, a control module 611 (e.g., the control module 130 or 513) may receive the user's voice input for requesting purchase of the specific goods, through a microphone (e.g., the microphone 111) or may receive a button input for confirming purchase of the specific goods, through a touch screen display (e.g., the display 153).

In this case, the control module 611 may determine whether the specific goods are sold online. For example, the control module 611 may discern the type of specific goods and may identify a purchase route for the specific goods. The purchase route for the specific goods may be classified into, for example, personal visit to a store, purchase over a phone, and online purchase. Furthermore, information about the purchase route for the specific goods may be stored and managed in a memory 613 (e.g., the information storage module 170).

In the case where the purchase route of the specific goods is a personal visit to a store, the control module 611 may identify location information of a store where the specific goods are sold (e.g., a store operated by a goods seller 630), which is stored in the memory 613, and may mark the location information of the store on a map displayed on the display or may output the location information of the store with sound through the speaker 935.

In the case where the purchase route of the specific goods is purchase over a phone, the control module 611 may search for a telephone number of a store where the specific goods are sold (e.g., the store operated by the goods seller 630) and may call the telephone number of the store through a telephone application 631a.

In the case where the purchase route of the specific goods is online purchase, the control module 611 may search for an online server 631 (e.g., a goods purchase site) where the specific goods are sold and may connect to the online server 631 through a goods purchase application 631b (e.g., a web search application). According to an embodiment, the goods purchase application 631b may include an application for a connection to a site where online connection and purchase of goods are possible. The goods purchase application 631b may include a third party application distributed by the goods seller 630 and may include a third party application distributed by a goods purchase service provider that acts for various goods sellers 630 to purchase registered goods.

According to an embodiment, the control module 611 may support payment for the specific goods through a payment application 631c when a user purchases the specific goods online.

Figure 7:
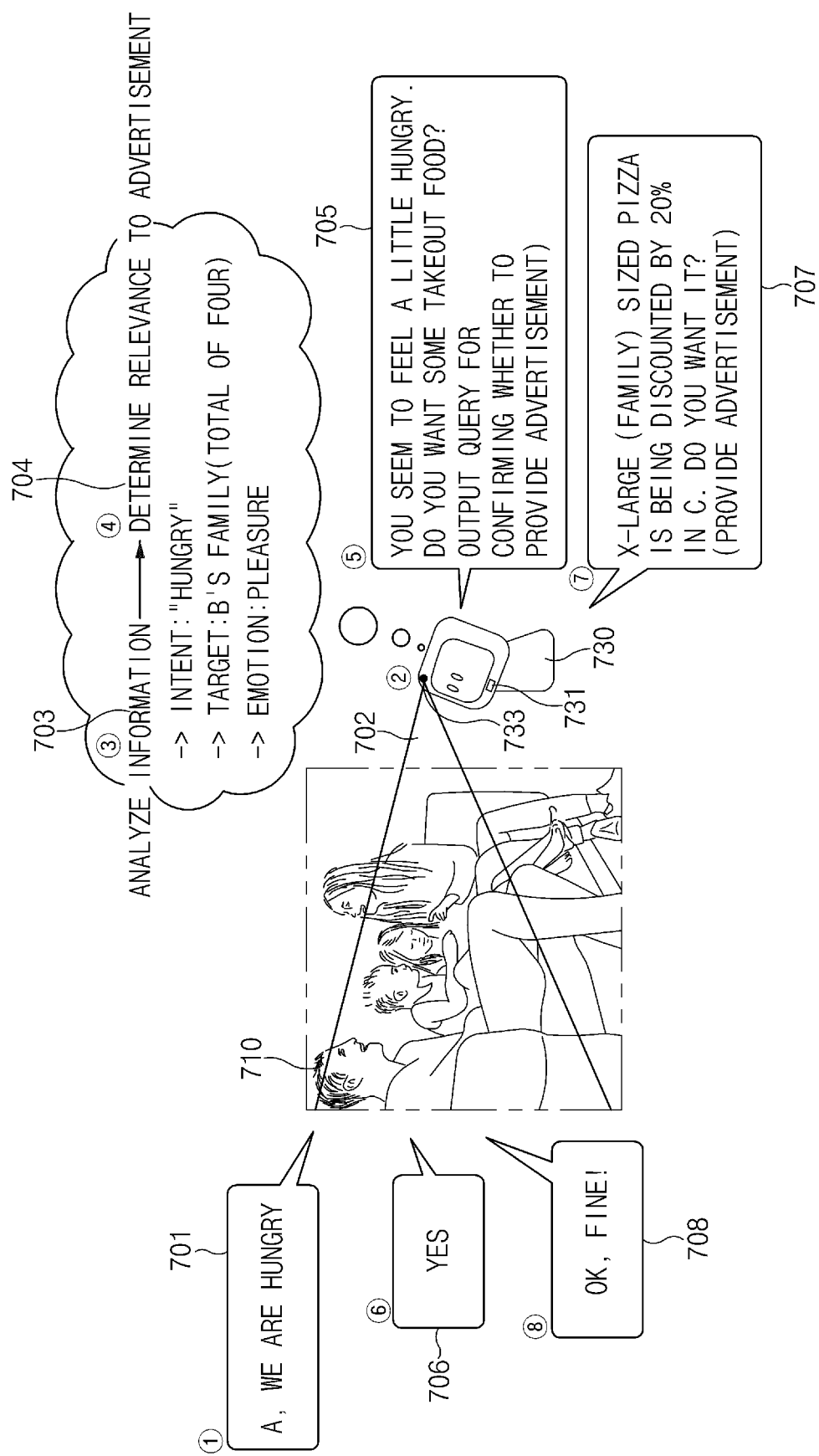
FIG. 7 is a view for explaining a situation of providing information according to an embodiment.

FIG. 7 illustrates a provision of information according to an embodiment of the present disclosure.

An electronic device 730 (e.g., the electronic device 100, 530, or 610) may collect information related to a user 710 through an information collection module (e.g., the information collection module 110 or 511). For example, a control module (e.g., the control module 130, 513, or 611) may receive a voice input of the user 710 through a microphone 731 (e.g., the microphone 111) and may obtain an image of the user 710 and surroundings of the user 710 through a camera 733 (e.g., the camera 113). Furthermore, the control module may analyze the obtained information to determine an intent, an emotion, or a situation of the user 710, may select information (e.g., an advertisement) for the user 710, may make at least one query to the user 710 to confirm whether to provide the information, and may provide the information to the user 710 when a condition set for determining whether to provide the information is satisfied (e.g., when an attained value is greater than or equal to a specified magnitude), thereby providing the information at the right time such that the user 710 does not feel uncomfortable about providing information.

Referring to FIG. 7, in operation 701, the control module may receive a voice input (e.g., "A, we are hungry") of the user 710 through the microphone 731. Furthermore, in operation 702, the control module may obtain an image of the user 710 and surroundings of the user 710 through the camera 733.

In operation 703, the control module may analyze the obtained information. For example, the control module may perform voice recognition and/or voice print recognition on the received voice input and may identify words included in the voice input of the user 710. Furthermore, the control module may perform an image analysis on the obtained image to identify an expression of the user 710, the current location of the user 710, or information about persons with the user 710 (e.g., the number of persons, relationships with the user 710, or the like). In this regard, the control module may identify the words, the expression of the user 710, the current location of the user 710, or the information about the persons with the user 710 by using information stored in advance in an information storage module (e.g., the information storage module 170, the user profile database 550, or the memory 613). For example, information about various words and information about the user 710 and acquaintances of the user 710 may be stored in advance in the information storage module.

The control module may determine an intent, an emotion, or a situation of the user 710 through the information analysis. For example, through the voice recognition of "A, we are hungry", the control module may identify a predetermined emotional state of hunger—indicating that the user 710 feels hungry, and the utterance of the user 710 indicates relevance of relieving that hunger. Furthermore, through the image analysis, the control module may determine that the user 710 (e.g., "B") is with his/her family (e.g., by facial recognition of the members and pre-stored identification of the family members), the total number of persons is four, and there is a "pleasant" expression on the face of the user 710 (e.g., based on prestored mapping between certain facial expression characteristics and an emotional state identified as "pleasant"). Consequently, through the information analysis, the control module may determine that the user 710 corresponds to a "hunger" emotional state, and further that "food" categories of products and advertisements are relevant—due to a need food to eat with his/her family.

In operation 704, the control module may determine whether the intent, emotion, or situation of the user 710 is relevant to an advertisement. For example, the control module may determine whether the user 710 wants to receive an advertisement for specific goods. Relevance to an advertisement may be determined by conducting a comprehensive analysis on, for example, whether specific goods need to be purchased, whether a vendor offering specific goods exists, and the like.

When it is determined that the user 710 wants to receive an advertisement for specific goods, in operation 705, the control module may output, through an information output module (e.g., the information output module 150 or 515), a query prompting the user to confirm whether to provide the advertisement for the specific goods (e.g., "You seem to feel a little hungry. Do you want some takeout food?"). The query can be previously defined and stored in memory, and retrieved via association with the identified characteristics of the user and other users in the image, and the various inputs and identified emotional state.

According to an embodiment, the control module may set an advertisement provision condition for deciding whether to provide an advertisement. For example, the control module may make a query to a user to confirm whether to provide an advertisement, and when the user reacts to the query, the control module may determine the tendency of the user's intent through the reaction of the user. At this time, to decide that the tendency of the user's intent is sufficient to receive the advertisement, the control module may quantify the tendency of the user's intent and may determine whether the quantified data satisfies the condition for deciding whether to provide an advertisement.

Thereafter, as in operation 706, the control module may collect a reaction of the user 710 to the query. For example, the control module may receive the user's answer (e.g., "Yes") through the microphone 731. In another example, the control module may obtain an image of the user 710 through the camera 733.

In this case, the control module may analyze the obtained information and may determine whether the advertisement provision condition set for deciding whether to provide an advertisement is satisfied, based on a result obtained by analyzing the information. For example, the control module may calculate an attained value for the advertisement provision condition by analyzing the collected information. For example, the control module may increase the attained value when the user gives an affirmative answer to the query and may decrease the attained value when the user gives a negative answer to the query.

In the case where the attained value is less than a specified magnitude (e.g., a first value), the control module may attempt an everyday conversation irrelevant to an advertisement. Furthermore, in the case where the attained value is greater than or equal to a specified magnitude (e.g., a second value), the control module may, in operation 707, provide an advertisement (e.g., "X-large family sized pizza is being discounted by 20% in C. Do you want it?") to the user through the information output module. For example, the control module may output the advertisement on a display (e.g., the display 153), or may output the advertisement through a speaker (e.g., the speaker 151).

In some embodiments, when the attained value is greater than or equal to the specified magnitude (e.g., the second value), the control module may output a query to receive, from the user 710, a definite answer to whether the user 710 wants to receive an advertisement. For example, the control module may provide, to the user, a query for confirmation, such as "Do you want to receive an advertisement for pizza?"

In another example, in the case where the attained value is greater than or equal to the first value, but is less than the second value, the control module may output again another query for confirming whether to provide an advertisement, through the information output module. Consequently, until the attained value becomes less than the first magnitude or greater than or equal to the second magnitude, the control module may output at least one query for confirming whether to provide an advertisement, through the information output module.

When receiving, from the user 710, a request for purchase of specific goods exposed through the advertisement (e.g., X-large pizza from C), as in operation 708, after providing the advertisement, the control module may proceed with purchase of the specific goods. For example, the control module may identify a purchase route of the specific goods and may support the purchase according to the purchase route.

Figure 8:
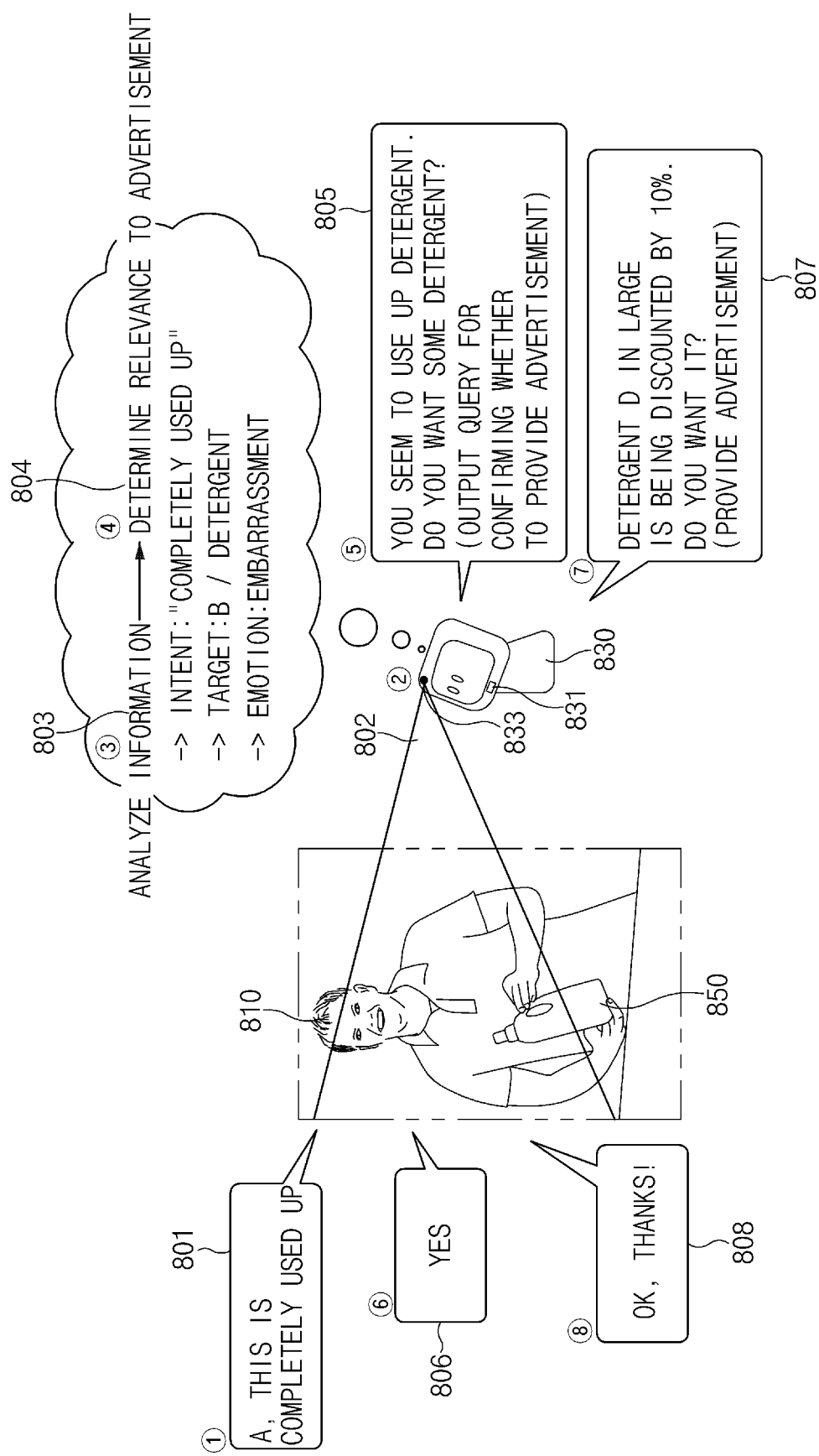
FIG. 8 is a view for explaining a situation of providing information according to another embodiment.

FIG. 8 is a view for explaining a situation of providing information according to another embodiment.

Referring to FIG. 8, in operations 801 and 802, an electronic device 830 (e.g., the electronic device 100, 530, 610, or 730) may collect information related to a user 810 through an information collection module (e.g., the information collection module 110 or 511). For example, as in operation 801, a control module (e.g., the control module 130, 513, or 611) may receive a voice input of the user 810 (e.g., "A, this is completely used up") through a microphone 831 (e.g., the microphone 111). Furthermore, as in operation 802, the control module may obtain an image of the user 810 and surroundings of the user 810 through a camera 833 (e.g., the camera 113).

In operation 803, the control module may analyze the obtained information. For example, the control module may perform voice recognition and/or voice print recognition on the received voice input and may identify words included in the voice input of the user 810. Furthermore, the control module may perform an image analysis on the obtained image to identify an expression of the user 810, the current location of the user 810, or information about persons with the user 810.

FIG. 8 illustrates a state in which the user 810 utters "This is completely used up" while holding a container for detergent 850. In this case, the control module may perform an image analysis to determine that the word "this" included in the voice input of the user 810 indicates the detergent 850 and the text "completely used up" means that the detergent 850 is completely used up. Consequently, the control module may determine that the detergent 850 should be ordered.

According to an embodiment, when the polysemous Korean word meaning "dropped" or "used up" is not used together with the Korean word meaning "completely", this may mean that the detergent 850 has been dropped on the floor. For example, when a specific word (e.g., Korean for "dropped/used up") is combined with another word (e.g., Korean for "completely"), the meaning may be diversely modified based on the context of other words. Thus, words in which the meaning is modified by a combination of other adjacent words may be stored and managed in an information storage module (e.g., the information storage module or the memory 613).

In operation 804, as in previously described embodiments, the control module may determine whether the intent, emotion, or situation of the user 810 is relevant to an advertisement. For example, the control module may determine whether the user 810 wants to receive an advertisement for specific goods. Relevance to an advertisement may be determined by conducting a comprehensive analysis on, for example, whether specific goods need to be purchased, whether a vendor offering specific goods exists, and the like.

When it is determined that the user 810 wants to receive an advertisement for specific goods, in operation 805, the control module may output, through an information output module (e.g., the information output module 150 or 515), a query for prompting confirming on whether to provide the advertisement for the specific goods (e.g., "You seem to use up detergent. Do you want some detergent?").

According to an embodiment, the control module may set an advertisement provision condition for deciding whether to provide an advertisement. For example, the control module may make a query to a user to confirm whether to provide an advertisement, and when the user reacts to the query, the control module may determine the tendency of the user's intent through the reaction of the user. At this time, to decide that the tendency of the user's intent is sufficient to receive the advertisement, the control module may quantify the tendency of the user's intent and may determine whether the quantified data satisfies the condition for deciding whether to provide an advertisement.

Thereafter, as in operation 806, the control module may collect a reaction of the user 810 to the query. For example, the control module may receive the user's answer (e.g., "Yes") through the microphone 831. In another example, the control module may obtain an image of the user 810 through the camera 833.

In this case, the control module may analyze the obtained information and may determine whether the advertisement provision condition set for deciding whether to provide an advertisement is satisfied, based on a result obtained by analyzing the information. For example, the control module may calculate an attained value for the advertisement provision condition by analyzing the collected information. For example, the control module may increase the attained value when the user gives an affirmative answer to the query and may decrease the attained value when the user gives a negative answer to the query.

In the case where the attained value is less than a specified magnitude (e.g., a first value), the control module may attempt an everyday conversation irrelevant to an advertisement. Furthermore, in the case where the attained value is greater than or equal to a specified magnitude (e.g., a second value), the control module may, in operation 807, provide an advertisement (e.g., "Detergent D in large is being discounted by 10%. Do you want it?") to the user through the information output module. For example, the control module may output the advertisement on a display (e.g., the display 153), or may output the advertisement through a speaker (e.g., the speaker 151).

In some embodiments, when the attained value is greater than or equal to the specified magnitude (e.g., the second value), the control module may output a query to receive, from the user 810, a definite answer to whether the user 810 wants to receive an advertisement. For example, the control module may provide, to the user, a query for confirmation, such as "Do you want to receive an advertisement for detergent?"

In another example, in the case where the attained value is greater than or equal to the first value, but is less than the second value, the control module may output again another query for confirming whether to provide an advertisement, through the information output module. Consequently, until the attained value becomes less than the first magnitude or greater than or equal to the second magnitude, the control module may output at least one query for confirming whether to provide an advertisement, through the information output module.

When receiving, from the user 810, a request for purchase of specific goods exposed through the advertisement (e.g., large size detergent D), as in operation 808, after providing the advertisement, the control module may proceed with purchase of the specific goods. For example, the control module may identify a purchase route of the specific goods and may support the purchase according to the purchase route.

Figure 9:
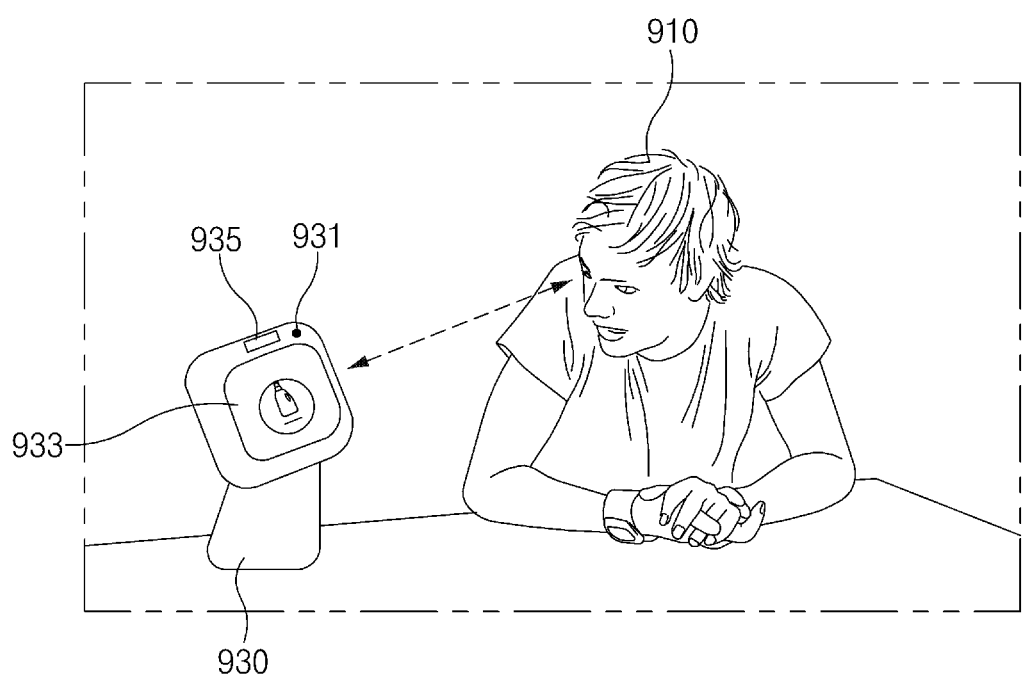
FIG. 9 is a view for explaining a method for proceeding with purchase of goods according to an embodiment.

FIG. 9 is a view for explaining a method for proceeding with purchase of goods according to an embodiment.

An electronic device 930 (e.g., the electronic device 100, 530, 610, 730, or 830) may support the purchase of goods. For example, a control module (e.g., the control module 130, 513, or 611) may identify a purchase "route" of the goods, meaning a purchasing method through a retailer front-end (such as an identified retail website for acquiring the desired product) and may support the purchase of the goods in different ways according to the purchase route of the goods.

Referring to FIG. 9, the control module may provide an advertisement for one or more products to a user 910 through a display 933 (e.g., the display 153) and/or a speaker 935 (e.g., the speaker 151). Thereafter, when a request for purchase of a present displayed product is received from the user 910, the control module may initiate identification of a purchase route of the specific product or goods. Possible purchase routes for the specific goods may be classified into, for example, a personal visit to a store, a purchase over a phone, and an online purchase. Furthermore, information about the purchase route for the specific goods may be stored and managed in an information storage module (e.g., the information storage module 170 or the memory 613) for retrieval and usage when the user indicates a desire to purchase a product.

In the case where the purchase route is a personal visit to a store, the control module may identify a physical location of a store where the desired products are sold, as retrieved from storage in the information storage module, and may indicate the location information of the store on a map displayed on the display 933, and/or may output an address and generation directions to the store with sound through the speaker 935.

In the case where the purchase route is purchase over a phone, the control module may identify for a telephone number corresponding to a retailer where the specific goods are sold and may initiate a telephonic call to the telephone number of the store through a dialer application (e.g., the telephone application 631*a*). At this time, the control module may output an execution screen of the telephone application on the display 933.

In the case where the purchase route is online purchase, the control module may identify an online website or server (e.g., the online server 631) where the specific goods are sold and may connect to the online server through a goods purchase application (e.g., the goods purchase application 631*b*), such as a web browser or specific application for that retailer. At this time, the control module may output an execution screen of the goods purchase application on the display 933.

According to an embodiment, the control module may further support payment for the specific goods through a payment application (e.g., the payment application 631*c*) when the user 910 purchases the specific goods online. The payment application may authenticate the user 910 by using biometric information of the user 910 and may permit the authenticated user 910 to purchase the specific goods. For example, when the control module executes the payment application, a user authentication process may be performed according to a program routine of the payment application. The user authentication process may include, for example, face recognition using a camera 931, iris recognition using an iris sensor, voice print recognition for a voice input received through a microphone, or the like.

Figure 10:
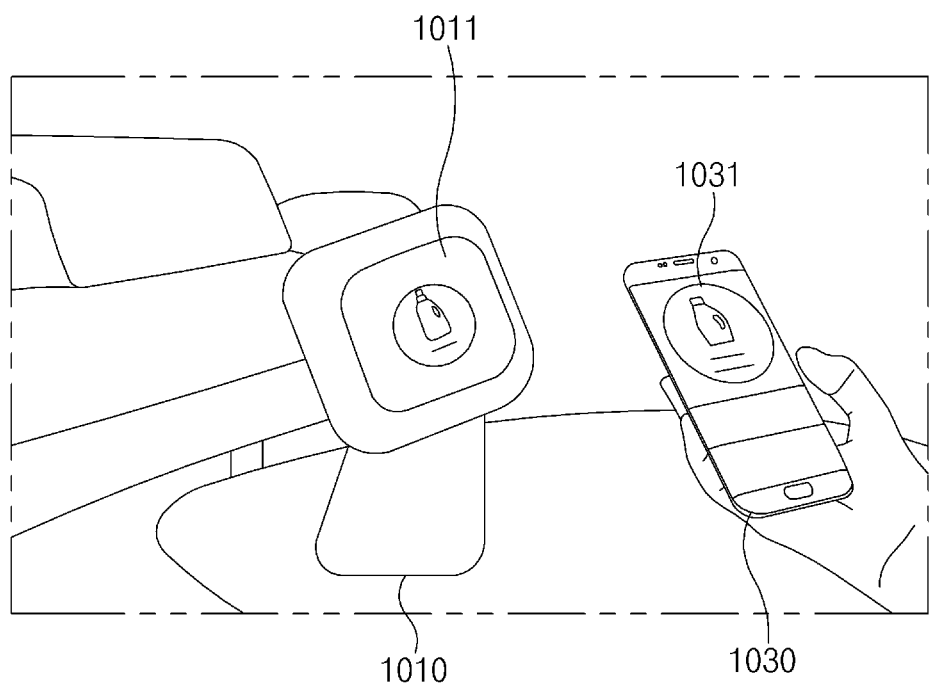
FIG. 10 is a view for explaining a method for proceeding with purchase of goods according to another embodiment.

FIG. 10 is a view for explaining a method for proceeding with purchase of goods according to another embodiment.

Referring to FIG. 10, an electronic device 1010 (e.g., the electronic device 100, 530, 610, 730, 830, or 930) may support payment through a payment application (e.g., the payment application 631*c*) at the time of purchase of goods. The payment application may be installed in the electronic device 1010 or in an external electronic device 1030 (e.g., a smartphone).

When proceeding with purchase of goods through the payment application installed in the external electronic device 1030, the electronic device 1010 may be in communication with the external electronic device 1030 via a communication circuit (e.g., an NFC communication circuit). For example, the electronic device 1010 may output an advertisement for specific goods through a display 1011 (e.g., the display 153 or 933) and may be on standby for a connection with the external electronic device 1030 via the communication circuit. Furthermore, the external electronic device 1030 may execute the payment application and may output an execution screen of the payment application on a display 1031. In this case, the external electronic device 1030 may receive information about the specific goods from the electronic device 1010 and may output payment information of the specific goods on the display 1031 when the external electronic device 1030 and the electronic device 1010 are connected together via the communication circuit by bringing the external electronic device 1030 to a close location to the electronic device 1010. Thereafter, the external electronic device 1030 may authenticate a user through face authentication, iris authentication, or voice print authentication and may proceed with a purchase process for the specific goods.

Figure 11:
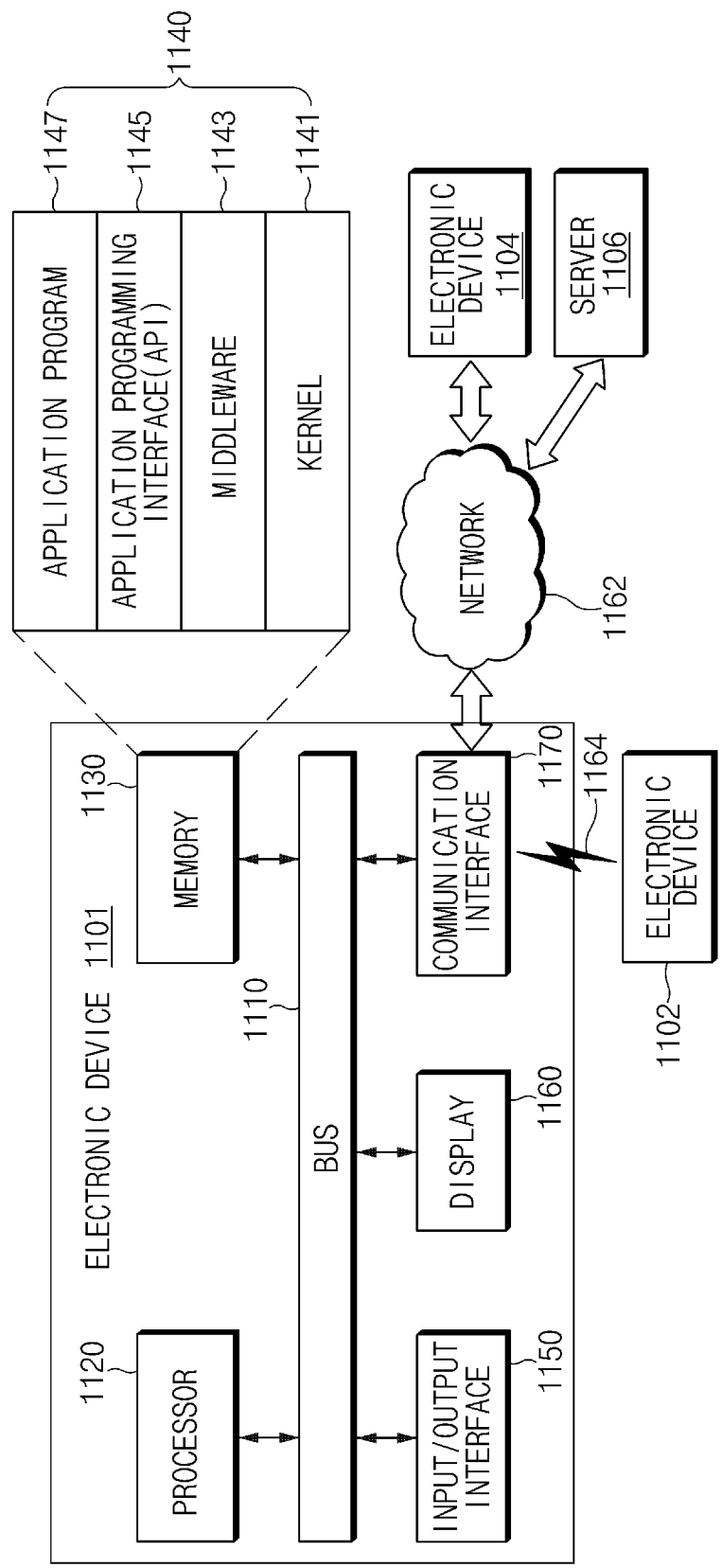
FIG. 11 illustrates an electronic device in a network environment according to an embodiment of the present disclosure.

FIG. 11 illustrates an electronic device in a network environment according to an embodiment of the present disclosure.

An electronic device 1101 in a network environment 1100 according to various embodiments of the present disclosure will be described with reference to FIG. 11. The electronic device 1101 may include a bus 1110, a processor 1120, a memory 1130, an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a central processing unit (CPU), an application processor (AP), or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to (an)other element(s) of the electronic device 1101. Furthermore, the input/output interface 1150 may output instructions or data received from (an)other element(s) of the electronic device 1101 to the user or another external device.

The display 1160 may include, for example, a liquid crystal display (LCD), a light-emitting diode (LED) display, an organic light-emitting diode (OLED) display, a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1164. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1162 may include at least one of telecommunications networks, for example, a computer network (e.g., local area network (LAN) or wide area network (WAN)), the Internet, or a telephone network.

The types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first external electronic device 1102, the second external electronic device 1104, or the server 1106). When the electronic device 1101 should perform a certain function or service automatically or in response to a request, the electronic device 1101 may request at least a portion of functions related to the function or service from another device (e.g., the first external electronic device 1102, the second external electronic device 1104, or the server 1106) instead of or in addition to performing the function or service for itself. The other electronic device (e.g., the first external electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 12:
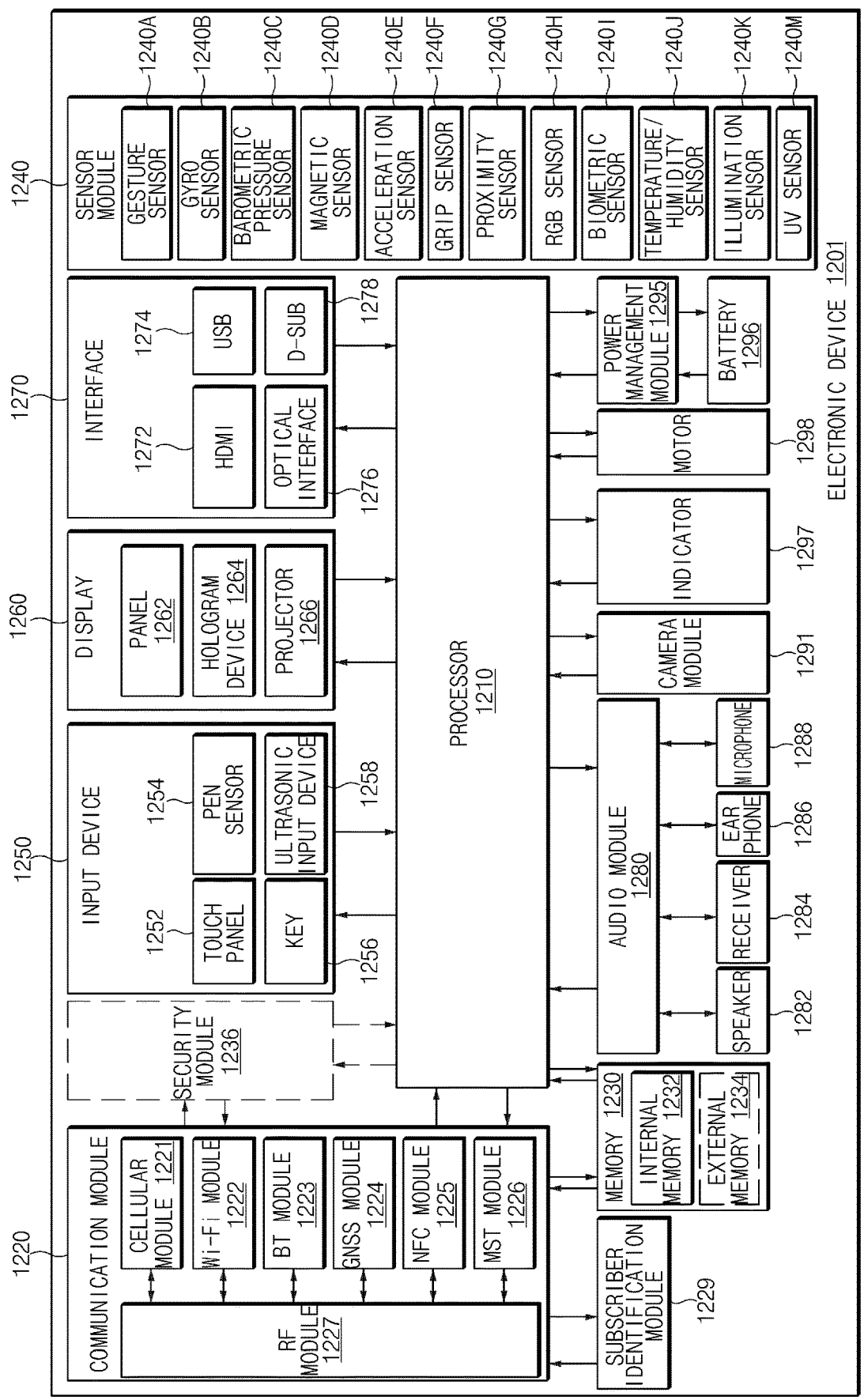
FIG. 12 is a block diagram illustrating a configuration of an electronic device according to an embodiment of the present disclosure.

FIG. 12 is a block diagram illustrating a configuration of an electronic device according to an embodiment of the present disclosure.

Referring to FIG. 12, the electronic device 1201 may include, for example, all or part of an electronic device 1101 shown in FIG. 11. The electronic device 1201 may include one or more processors 1210 (e.g., application processors (APs)), a communication module 1220, a subscriber identification module (SIM) 1229, a memory 1230, a security module 1236, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application program to control a plurality of hardware or software components connected thereto and may process and compute a variety of data. The processor 1210 may be implemented with, for example, a system on chip (SoC). According to an embodiment of the present disclosure, the processor 1210 may include a graphic processing unit (GPU) (not shown) and/or an image signal processor (not shown). The processor 1210 may include at least some (e.g., a cellular module 1221) of the components shown in FIG. 12. The processor 1210 may load a command or data received from at least one of other components (e.g., a non-volatile memory) into a volatile memory to process the data and may store various data in a non-volatile memory.

The communication module 1220 may have the same or similar configuration to the communication interface 1170 of FIG. 11. The communication module 1220 may include, for example, the cellular module 1221, a wireless-fidelity (Wi-Fi) module 1222, a Bluetooth (BT) module 1223, a global navigation satellite system (GNSS) module 1224 (e.g., a GPS module, a Glonass module, a Beidou module, or a Galileo module), a near field communication (NFC) module 1225, an MST module 1226, and a radio frequency (RF) module 1227.

The cellular module 1221 may provide, for example, a voice call service, a video call service, a text message service, or an Internet service, and the like through a communication network. According to an embodiment of the present disclosure, the cellular module 1221 may identify and authenticate the electronic device 1201 in a communication network using the SIM 1229 (e.g., a SIM card). According to an embodiment of the present disclosure, the cellular module 1221 may perform at least part of functions which may be provided by the processor 1210. According to an embodiment of the present disclosure, the cellular module 1221 may include a communication processor (CP).

The Wi-Fi module 1222, the BT module 1223, the GNSS module 1224, the NFC module 1225, or the MST module 1226 may include, for example, a processor for processing data transmitted and received through the corresponding module. According to various embodiments of the present disclosure, at least some (e.g., two or more) of the cellular module 1221, the Wi-Fi module 1222, the BT module 1223, the GNSS module 1224, the NFC module 1225, or the MST module 1226 may be included in one integrated chip (IC) or one IC package.

The RF module 1227 may transmit and receive, for example, a communication signal (e.g., an RF signal). Though not shown, the RF module 1227 may include, for example, a transceiver, a power amplifier module (PAM), a frequency filter, or a low noise amplifier (LNA), or an antenna, and the like. According to another embodiment of the present disclosure, at least one of the cellular module 1221, the Wi-Fi module 1222, the BT module 1223, the GNSS module 1224, the NFC module 1225, or the MST module 1226 may transmit and receive an RF signal through a separate RF module.

The SIM 1229 may include, for example, a card which includes a SIM and/or an embedded SIM. The SIM 1229 may include unique identification information (e.g., an integrated circuit card identifier (ICCID)) or subscriber information (e.g., an international mobile subscriber identity (IMSI)).

The memory 1230 (e.g., a memory 1130 of FIG. 11) may include, for example, an embedded memory 1232 or an external memory 1234. The embedded memory 1232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1234 may include a flash drive, for example, a compact flash (CF), a secure digital (SD), a micro-SD, a mini-SD, an extreme digital (xD), a multimedia car (MMC), or a memory stick, and the like. The external memory 1234 may operatively and/or physically connect with the electronic device 1201 through various interfaces.

The security module 1236 may be a module which has a relatively higher secure level than the memory 1230 and may be a circuit which stores secure data and guarantees a protected execution environment. The security module 1236 may be implemented with a separate circuit and may include a separate processor. The security module 1236 may include, for example, an embedded secure element (eSE) which is present in a removable smart chip or a removable SD card or is embedded in a fixed chip of the electronic device 1201. Also, the security module 1236 may be driven by an OS different from the OS of the electronic device 1201. For example, the security module 1236 may operate based on a Java card open platform (JCOP) OS.

The sensor module 1240 may measure, for example, a physical quantity or may detect an operation state of the electronic device 1201, and may convert the measured or detected information to an electric signal. The sensor module 1240 may include at least one of, for example, a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 12401, a temperature/humidity sensor 1240J, an illumination sensor 1240K, or an ultraviolet (UV) sensor 1240M. Additionally or alternatively, the sensor module 1240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1240 may further include a control circuit for controlling at least one or more sensors included therein. According to various embodiments of the present disclosure, the electronic device 1201 may further include a processor configured to control the sensor module 1240, as part of the processor 1210 or to be independent of the processor 1210. While the processor 1210 is in a sleep state, the electronic device 1201 may control the sensor module 1240.

The input device 1250 may include, for example, a touch panel 1252, a (digital) pen sensor 1254, a key 1256, or an ultrasonic input device 1258. The touch panel 1252 may use at least one of, for example, a capacitive type, a resistive type, an infrared type, or an ultrasonic type. Also, the touch panel 1252 may further include a control circuit. The touch panel 1252 may further include a tactile layer and may provide a tactile reaction to a user.

The (digital) pen sensor 1254 may be, for example, part of the touch panel 1252 or may include a separate sheet for recognition. The key 1256 may include, for example, a physical button, an optical key, or a keypad. The ultrasonic input device 1258 may allow the electronic device 1201 to detect a sound wave using a microphone (e.g., a microphone 1288) and to verify data through an input tool generating an ultrasonic signal.

The display 1260 (e.g., a display 1160 of FIG. 11) may include a panel 1262, a hologram device 1264, or a projector 1266. The panel 1262 may include the same or similar configuration to the display 1160. The panel 1262 may be implemented to be, for example, flexible, transparent, or wearable. The panel 1262 and the touch panel 1252 may be integrated into one module. The hologram device 1264 may show a stereoscopic image in a space using interference of light. The projector 1266 may project light onto a screen to display an image. The screen may be positioned, for example, inside or outside the electronic device 1201. According to an embodiment of the present disclosure, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature 1278. The interface 1270 may be included in, for example, the communication interface 1170 shown in FIG. 11. Additionally or alternatively, the interface 1270 may include, for example, a mobile high definition link (MHL) interface, an SD card/multimedia card (MMC) interface, or an infrared data association (IrDA) standard interface.

The audio module 1280 may convert a sound and an electric signal in dual directions. At least part of components of the audio module 1280 may be included in, for example, an input/output interface 1150 (or a user interface) shown in FIG. 11. The audio module 1280 may process sound information input or output through, for example, a speaker 1282, a receiver 1284, an earphone 1286, or the microphone 1288, and the like.

The camera module 1291 may be a device which captures a still image and a moving image. According to an embodiment of the present disclosure, the camera module 1291 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1295 may manage, for example, power of the electronic device 1201. According to an embodiment of the present disclosure, though not shown, the power management module 1295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1296 and voltage, current, or temperature thereof while the battery 1296 is charged. The battery 1296 may include, for example, a rechargeable battery or a solar battery.

The indicator 1297 may display a specific state of the electronic device 1201 or part (e.g., the processor 1210) thereof, for example, a booting state, a message state, or a charging state, and the like. The motor 1298 may convert an electric signal into mechanical vibration and may generate vibration or a haptic effect, and the like. Though not shown, the electronic device 1201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 13:
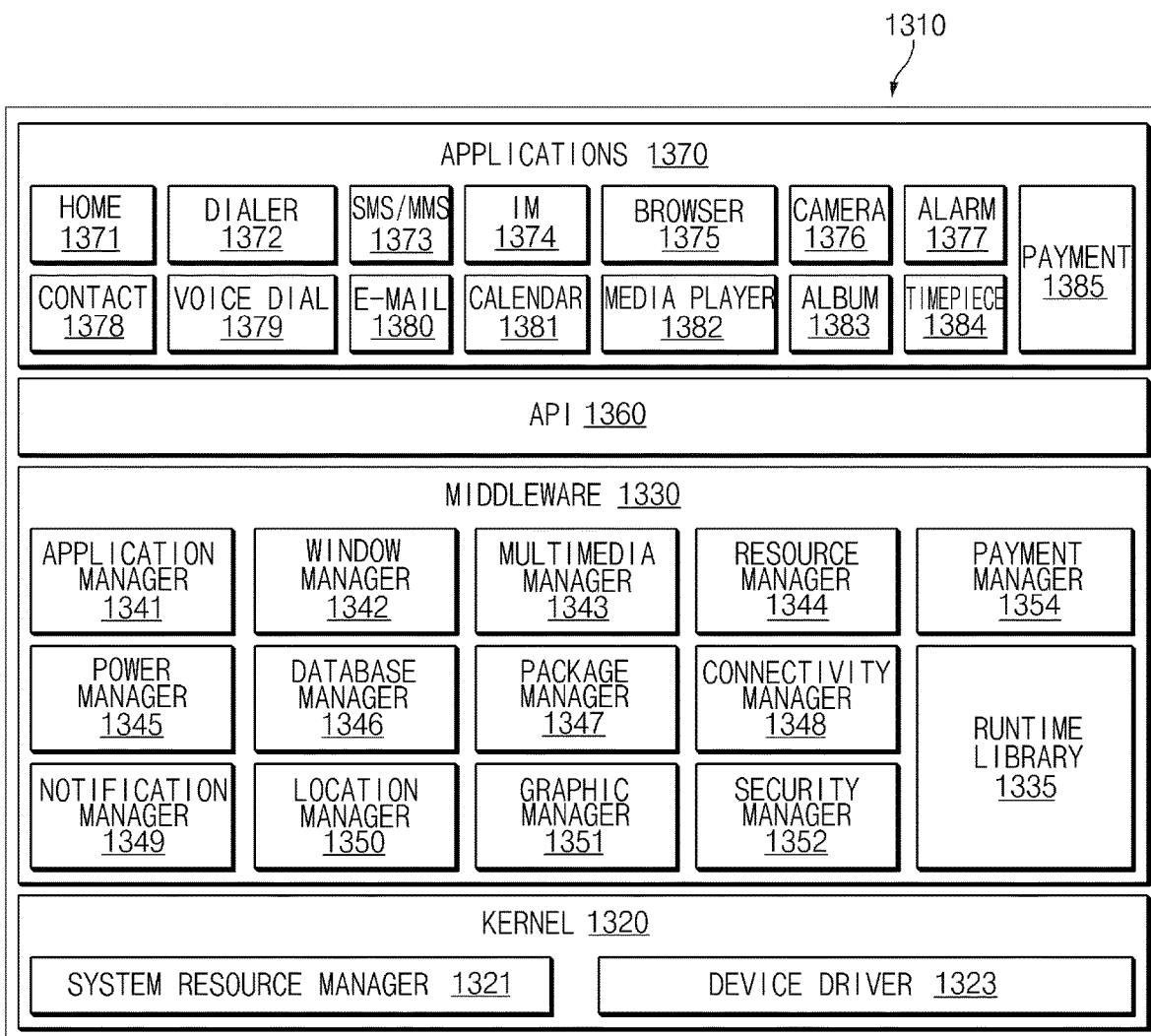
FIG. 13 is a block diagram illustrating a configuration of a program module 1310 according to an embodiment of the present disclosure.

FIG. 13 is a block diagram illustrating a configuration of a program module 1310 according to an embodiment of the present disclosure.

According to an embodiment of the present disclosure, the program module 1310 (e.g., a program 1140 of FIG. 11)

may include an operating system (OS) for controlling resources associated with an electronic device (e.g., an electronic device 1101 of FIG. 11) and/or various applications (e.g., an application program 1147 of FIG. 11) which are executed on the OS. The OS may be, for example, Android, iOS, Windows, Symbian, Tizen, or Bada, and the like.

The program module 1310 may include a kernel 1320, a middleware 1330, an application programming interface (API) 1360, and/or an application 1370. At least part of the program module 1310 may be preloaded on the electronic device, or may be downloaded from an external electronic device (e.g., a first external electronic device 1102, a second external electronic device 1104, or a server 1106, and the like of FIG. 11).

The kernel 1320 (e.g., a kernel 1141 of FIG. 11) may include, for example, a system resource manager 1321 and/or a device driver 1323. The system resource manager 1321 may control, assign, or collect, and the like system resources. According to an embodiment of the present disclosure, the system resource manager 1321 may include a process management unit, a memory management unit, or a file system management unit, and the like. The device driver 1323 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1330 (e.g., a middleware 1143 of FIG. 11) may provide, for example, functions the application 1370 needs in common, and may provide various functions to the application 1370 through the API 1360 such that the application 1370 efficiently uses limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module used by a compiler to add a new function through a programming language while the application 1370 is executed. The runtime library 1335 may perform a function about input and output management, memory management, or an arithmetic function.

The application manager 1341 may manage, for example, a life cycle of at least one of the application 1370. The window manager 1342 may manage graphic user interface (GUI) resources used on a screen of the electronic device. The multimedia manager 1343 may determine a format utilized for reproducing various media files and may encode or decode a media file using a codec corresponding to the corresponding format. The resource manager 1344 may manage source codes of at least one of the application 1370, and may manage resources of a memory or a storage space, and the like.

The power manager 1345 may act together with, for example, a basic input/output system (BIOS) and the like, may manage a battery or a power source, and may provide power information utilized for an operation of the electronic device. The database manager 1346 may generate, search, or change a database to be used in at least one of the application 1370. The package manager 1347 may manage installation or update of an application distributed by a type of a package file.

The connectivity manager 1348 may manage, for example, wireless connection such as Wi-Fi connection or BT connection, and the like. The notification manager 1349 may display or notify events, such as an arrival message, an appointment, and proximity notification, by a method which is not disturbed to the user. The location manager 1350 may manage location information of the electronic device. The graphic manager 1351 may manage a graphic effect to be provided to the user or a user interface (UI) related to the graphic effect. The security manager 1352 may provide all security functions utilized for system security or user authentication, and the like. According to an embodiment of the present disclosure, when the electronic device (e.g., an electronic device 1101 of FIG. 11) has a phone function, the middleware 1330 may further include a telephony manager (not shown) for managing a voice or video communication function of the electronic device.

The middleware 1330 may include a middleware module which configures combinations of various functions of the above-described components. The middleware 1330 may provide a module which specializes according to kinds of OSs to provide a differentiated function. Also, the middleware 1330 may dynamically delete some of old components or may add new components.

The API 1360 (e.g., an API 1145 of FIG. 11) may be, for example, a set of API programming functions, and may be provided with different components according to OSs. For example, in case of Android or iOS, one API set may be provided according to platforms. In case of Tizen, two or more API sets may be provided according to platforms.

The application 1370 (e.g., an application program 1147 of FIG. 11) may include one or more of, for example, a home application 1371, a dialer application 1372, a short message service/multimedia message service (SMS/MMS) application 1373, an instant message (IM) application 1374, a browser application 1375, a camera application 1376, an alarm application 1377, a contact application 1378, a voice dial application 1379, an e-mail application 1380, a calendar application 1381, a media player application 1382, an album application 1383, a clock application 1384, a payment application 1385, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1370 may include an application (hereinafter, for better understanding and ease of description, referred to as "information exchange application") for exchanging information between the electronic device (e.g., the electronic device 1101 of FIG. 11) and an external electronic device (e.g., the first external electronic device 1102 or the second external electronic device 1104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1102 or the second external electronic device 1104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1102 or the second external electronic device 1104) which communicates with the electronic device, an application which operates in the external electronic device, or a service (e.g., a call service or a message service) provided from the external electronic device.

According to an embodiment of the present disclosure, the application 1370 may include an application (e.g., the health card application of a mobile medical device) which is preset according to attributes of the external electronic device (e.g., the first external electronic device 1102 or the second external electronic device 1104). According to an embodiment of the present disclosure, the application 1370 may include an application received from the external electronic device (e.g., the server 1106, the first external electronic device 1102, or the second external electronic device 1104). According to an embodiment of the present disclosure, the application 1370 may include a preloaded application or a third party application which may be downloaded from a server. Names of the components of the program module 1310 according to various embodiments of the present disclosure may differ according to kinds of OSs.

According to various embodiments of the present disclosure, at least part of the program module 1310 may be implemented with software, firmware, hardware, or at least two or more combinations thereof. At least part of the program module 1310 may be implemented (e.g., executed) by, for example, a processor (e.g., a processor 1210). At least part of the program module 1310 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a microphone;
a camera;
an output device;
a memory storing:
first data storing a plurality of pre-defined user states including at least one of a user intent, a user emotion and a user environment,
second data storing a plurality of user reactions including pre-defined user responses and information indicating user facial expressions,
a plurality of output information, classified according to conversational categories, and
a plurality of pre-defined queries, classified according to the conversational categories; and
a processor operatively coupled to the microphone, the camera, the output device, and the memory, the processor configured to:
receive an input including at least an image of a user captured through the camera,
authenticate the user by executing facial recognition on the received image of the user captured through the camera;
analyze the received input to select one of the user reactions from among the stored plurality of user reactions of the second data;
retrieve at least one pre-defined user state from the first data, based on mapping of the plurality of pre-defined user states to the plurality of user reactions;
identify a conversational category from the at least one pre-defined user state, based on mapping of the pre-defined user states and the conversational categories; and
select a first information from among the plurality of output information classified to the identified conversational category and output the selected first information through the output device;
select a first query from among the plurality of pre-defined queries included in the identified conversational category;

output the first query through the output device requesting a confirmation of whether to output the first information;

receive a second input including at least another image of the user and generate a numerical score based on the second input;

when the numerical score is greater than or equal to a first magnitude, output the first information through the output device;

when the numerical score is less than a second magnitude, select a second query not relevant to the first information and output the second query; and when the numerical score is greater than or equal to the second magnitude and less than the first magnitude, select a third query for confirming whether to output the first information from among the plurality of pre-defined queries and output the third query, wherein the third query is different from the first query.

2. The electronic device of claim 1, wherein when the input further includes a voice input, the processor is further configured to:

analyze the voice input using at least one of voice recognition and voice print recognition; and compare at least one word extracted from the voice input by the voice recognition and the voice print recognition at least one of the pre-defined user responses to identify the at least one pre-defined user state from among the first data.

3. The electronic device of claim 1, wherein when the input includes the image of the user, the processor is further configured to:

extract at least one object from the image different from the user;

identify the extracted at least one object by comparison of a feature of the extracted at least one object to known features stored in the memory; and compare the at least one identified object with a pre-stored mapping of known objects with known user environments to identify a matching user environment from among the first data.

4. The electronic device of claim 1, wherein selection of the first information from among the plurality of output information is further based on at least one of an age of the user, a gender of the user, a physical characteristic of the user, a brand historically preferred by the user, and a history indicating information output to the user previously from among the plurality of output information.

5. The electronic device of claim 1, wherein generating the numerical score further comprises:

identifying whether the second input responsive to the first query is classified into one of the categories of affirmative, negative or undecided;

increase the numerical score by a first predetermined magnitude when the second input is classified as affirmative;

decrease the numerical score by a second predetermined magnitude when the second input is classified as negative; and maintain the numerical score without change when the second input is classified as undecided.

6. The electronic device of claim 5, wherein when the second input further includes a voice input, the processor is further configured to:

perform at least one of voice recognition and voice print recognition on the second input to extract a word from the second input;

classifying the extracted word as affirmative, negative, or undecided, based on classification criterion stored in advance in the memory;

when the word is classified as affirmative, increase the numerical score by the first predetermined magnitude;

when the word is classified as negative, decrease the numerical score by the second predetermined magnitude; and when the word is classified as undecided, maintain the numerical score without change.

7. The electronic device of claim 1, wherein the processor is further configured to:

when the numerical score is greater than or equal to the first magnitude, output a query prompting final confirmation of whether to output the first information.

8. The electronic device of claim 1, wherein the selected first information is output through the output device when receiving a second input confirming requested output of the first information.

9. A method in an electronic device, the method comprising:

storing in a memory:
first data of a plurality of pre-defined user states including at least one of a user intent, a user emotion and a user environment,
second data of a plurality of user reactions including pre-defined user responses and information indicating user facial expressions,
a plurality of output information classified according to conversational categories, and
a plurality of pre-defined queries classified according to the conversational categories, receiving an input including at least an image of a user captured through a camera;

authenticating the user by executing facial recognition on the received image of the user captured through the camera;

analyzing by a processor the received input to select one of the user reactions from among the stored plurality of user reactions of the second data;

retrieving at least one pre-defined user state from the first data, based on mapping of the plurality of pre-defined user states to the plurality of user reactions;

identifying a conversational category from the at least one pre-defined user state, based on mapping of the pre-defined user states and the conversational categories;

selecting a first information from among the plurality of output information classified to the identified conversational category and outputting the selected first information through an output device;

selecting a first query from among the plurality of pre-defined queries included in the identified conversational category;

outputting the first query through the output device requesting a confirmation of whether to output the first information;

receiving a second input including at least another image of the user and generating a numerical score based on the second input;

when the numerical score is greater than or equal to a first magnitude, outputting the first information through the output device;

when the numerical score is less than a second magnitude, selecting a second query not relevant to the first information and output the second query; and when the numerical score is greater than or equal to the second magnitude and less than the first magnitude, selecting a third query for confirming whether to output the first information from among the plurality of pre-defined queries and outputting the third query, wherein the third query is different from the first query.

10. The method of claim 9, wherein when the input further includes a voice input, the method further comprises
analyzing the voice input using at least one of voice recognition and voice print recognition; and
comparing at least one word extracted from the voice input by the voice recognition and the voice print recognition at least one of the pre-defined user responses to identify the at least one pre-defined user state from among the first data.

11. The method of claim 9, wherein when the input includes the image of the user, the method further comprises:
extracting at least one object from the image different from the user;
identifying the extracted at least one object by comparison of a feature of the extracted at least one object to known features stored in the memory; and
comparing the at least one identified object with a pre-stored mapping of known objects with known user environments to identify a matching user environment from among the first data.

12. The method of claim 9, wherein selection of the first information from among the plurality of output information is further based on at least one of an age of the user, a gender of the user, a physical characteristic of the user, a brand historically preferred by the user, and a history indicating information output to the user previously from among the plurality of output information.

13. The method of claim 9, wherein generating the numerical score further comprises:
identifying whether the second input responsive to the first query is classified into one of the categories of affirmative, negative or undecided;
increasing the numerical score by a first predetermined magnitude when the second input is classified as affirmative;
decreasing the numerical score by a second predetermined magnitude when the second input is classified as negative; and
maintaining the numerical score without change when the second input is classified as undecided.

14. The method of claim 13, wherein when the second input further includes a voice input, the method further comprises:
performing at least one of voice recognition and voice print recognition on the second input to extract a word from the second input;
classifying the extracted word as affirmative, negative, or undecided, based on classification criterion stored in advance in the memory;
when the word is classified as affirmative, increasing the numerical score by the first predetermined magnitude;
when the word is classified as negative, decreasing the numerical score by the second predetermined magnitude; and
when the word is classified as undecided, maintaining the numerical score without change.

15. The method of claim 9, wherein when the numerical score is greater than or equal to the first magnitude, the method further comprises: outputting a query prompting final confirmation of whether to output the first information.

16. The method of claim 9, wherein the selected first information is output through the output device when receiving a second input confirming requested output of the first information.

* * * * *